US012570068B2

(12) United States Patent　　　　　(10) Patent No.:　US 12,570,068 B2
Borchardt et al.　　　　　　　　　　(45) Date of Patent:　　Mar. 10, 2026

(54) MULTI-LAYER THERMOPLASTIC FILMS AND BAGS CONFIGURED TO PROVIDE A PERCEIVABLE COLOR CHANGE UPON BEING SUBJECTED TO A STRAIN AND METHODS OF MAKING THE SAME

(71) Applicant: The Glad Products Company, Oakland, CA (US)

(72) Inventors: Michael G. Borchardt, Willowbrook, IL (US); Shaun T. Broering, Cincinnati, OH (US)

(73) Assignee: The Glad Products Company, Oakland, CA (US)

( * ) Notice: Subject to any disclaimer, the term of this patent is extended or adjusted under 35 U.S.C. 154(b) by 0 days.

(21) Appl. No.: 15/824,610

(22) Filed: Nov. 28, 2017

(65) Prior Publication Data

US 2019/0099973 A1　　Apr. 4, 2019

Related U.S. Application Data

(60) Provisional application No. 62/566,722, filed on Oct. 2, 2017.

(51) Int. Cl.
B31B 70/64　　　　(2017.01)
B30B 11/18　　　　(2006.01)
(Continued)

(52) U.S. Cl.
CPC ............ *B31B 70/645* (2017.08); *B30B 11/18* (2013.01); *B31B 70/8135* (2017.08); *B31B 70/88* (2017.08); *B32B 3/10* (2013.01); *B32B 3/28* (2013.01); *B32B 7/12* (2013.01); *B32B 37/1045* (2013.01); *B32B 38/0012* (2013.01);

*H04B 7/0452* (2013.01); *H04B 7/0617* (2013.01); *H04W 74/0816* (2013.01); *B31B 2155/0014* (2017.08); *B31B 2155/002* (2017.08); *B31B 2160/10* (2017.08); *B31B 2170/30* (2017.08)

(58) Field of Classification Search
CPC ..... B32B 1/02; B32B 27/32; Y10T 428/1352; B65D 88/00; B65S 88/00
USPC .................................................. 428/35.7, 500
See application file for complete search history.

(56) References Cited

U.S. PATENT DOCUMENTS 3,055,117 A * 9/1962 Bernstein ................. G09B 3/04
434/346
3,309,257 A * 3/1967 Borack ..................... B44F 1/04
428/41.7
(Continued)

*Primary Examiner* — Aaron Austin
(74) *Attorney, Agent, or Firm* — Keller Preece PLLC

(57) ABSTRACT

A multi-layer co-extruded film includes a first layer having a first color and a second layer having a second different color, wherein the first and second layers are co-extruded layers. The multi-layer co-extruded film also includes a plurality of intermittently stretched regions, wherein the multi-layer co-extruded film exhibits a perceivable color change when subjected to a strain. In perceivable color change or ΔE between about 2.50 and about 7.00. Methods of forming a multi-layer co-extruded film includes coextruding a first layer having a first color with a second layer having a second different color and intermittently stretching a plurality of regions of the multi-layer co-extruded film, wherein the first layer and the second layer are co-extruded and intermittently stretched to exhibit a perceivable color change when subjected to a strain.

20 Claims, 14 Drawing Sheets

(51) Int. Cl.

| | |
|---|---|
| *B31B 70/81* | (2017.01) |
| *B31B 70/88* | (2017.01) |
| *B32B 3/10* | (2006.01) |
| *B32B 3/28* | (2006.01) |
| *B32B 7/12* | (2006.01) |
| *B32B 37/10* | (2006.01) |
| *B32B 38/00* | (2006.01) |
| *H04B 7/0452* | (2017.01) |
| *H04B 7/06* | (2006.01) |
| *H04W 74/0816* | (2024.01) |
| *B31B 155/00* | (2017.01) |
| *B31B 160/10* | (2017.01) |
| *B31B 170/30* | (2017.01) |

(56) References Cited

U.S. PATENT DOCUMENTS

| | | | | |
|---|---|---|---|---|
| 5,091,236 A * | 2/1992 | Keller | ..................... | B32B 27/18 |
| | | | | 428/213 |
| 5,284,694 A * | 2/1994 | Lockridge | ............... | B32B 27/32 |
| | | | | 428/137 |
| 5,650,214 A | 7/1997 | Anderson et al. | | |
| 6,458,447 B1 | 10/2002 | Cabell et al. | | |
| 6,579,584 B1 * | 6/2003 | Compton | ................ | B29C 55/28 |
| | | | | 428/34.6 |
| 6,696,166 B2 * | 2/2004 | Bayley | .................. | B32B 27/322 |
| | | | | 428/523 |
| 6,719,742 B1 * | 4/2004 | McCormack | ............. | B32B 3/26 |
| | | | | 604/385.01 |
| D627,664 S | 11/2010 | Yang et al. | | |
| D635,467 S | 4/2011 | Kolovich et al. | | |
| D658,074 S | 4/2012 | Kolovich et al. | | |
| 8,343,411 B2 | 1/2013 | Arora et al. | | |
| 8,734,016 B2 | 5/2014 | Borchardt et al. | | |
| 8,865,294 B2 | 10/2014 | Cisek et al. | | |
| 8,975,210 B2 * | 3/2015 | Arora | ................ | A61F 13/51496 |
| | | | | 430/200 |
| 9,108,390 B2 | 8/2015 | Borchardt | | |
| 9,381,697 B2 | 7/2016 | Dorsey et al. | | |
| 9,381,718 B2 | 7/2016 | Dorsey et al. | | |
| 9,393,757 B2 | 7/2016 | Borchardt et al. | | |
| 9,604,429 B2 * | 3/2017 | Borchardt | ............. | B32B 27/205 |
| 2005/0123726 A1 * | 6/2005 | Broering | ............ | A44B 18/0011 |
| | | | | 428/172 |
| 2007/0264468 A1 * | 11/2007 | Boyd | ...................... | B32B 27/08 |
| | | | | 428/98 |
| 2008/0078498 A1 * | 4/2008 | Zeik | ........................ | B32B 27/30 |
| | | | | 156/277 |
| 2008/0233375 A1 * | 9/2008 | Wright | ...................... | C08J 5/18 |
| | | | | 428/219 |
| 2010/0233438 A1 * | 9/2010 | Stone | ........................ | B26F 1/26 |
| | | | | 428/172 |
| 2012/0039550 A1 * | 2/2012 | MacPherson | ............. | B32B 7/14 |
| | | | | 383/109 |
| 2012/0064271 A1 * | 3/2012 | Broering | ............ | B32B 38/0012 |
| | | | | 156/290 |
| 2012/0163738 A1 * | 6/2012 | Borchardt | ............... | B32B 27/36 |
| | | | | 383/107 |
| 2012/0242009 A1 * | 9/2012 | Mullane | ................ | A61F 13/513 |
| | | | | 264/405 |
| 2012/0269465 A1 * | 10/2012 | Dorsey | .................. | B65D 33/01 |
| | | | | 428/167 |
| 2012/0269466 A1 * | 10/2012 | Dorsey | .................. | B65D 31/02 |
| | | | | 383/109 |
| 2013/0011084 A1 | 1/2013 | Broering et al. | | |
| 2013/0209711 A1 * | 8/2013 | Borchardt | ............... | B29C 48/17 |
| | | | | 428/167 |
| 2013/0243982 A1 * | 9/2013 | Borchardt | ................ | B32B 3/28 |
| | | | | 428/167 |
| 2014/0334749 A1 * | 11/2014 | Borchardt | ............. | B65D 33/00 |
| | | | | 383/109 |
| 2015/0030266 A1 * | 1/2015 | Borchardt | ............... | B32B 7/023 |
| | | | | 156/218 |
| 2016/0046412 A1 * | 2/2016 | Kent | ...................... | B65D 33/28 |
| | | | | 24/30.5 P |
| 2018/0194099 A1 * | 7/2018 | Wilcoxen | ......... | B29C 66/83511 |
| 2020/0368995 A1 * | 11/2020 | Wilcoxen | ......... | B29C 66/73921 |
| 2022/0135285 A1 * | 5/2022 | Broering | ................ | B65F 1/002 |
| | | | | 383/116 |
| 2022/0144516 A1 * | 5/2022 | Waldron | .......... | B29C 66/81433 |

\* cited by examiner

| 9150-182- | A White LR (%) | C White (%) | D Black (%) | Big Diamond Films Outside No Strain | | | Big Diamond Films Outside 47% Strain | | | Stretch Effect |
|---|---|---|---|---|---|---|---|---|---|---|
| | | | | L* | a* | b* | L* | a* | b* | ΔE |
| 3 | 40 | 5 | 5 | 27.88 | 0.18 | 0.28 | 29.94 | 0.03 | -0.34 | 2.16 |
| 4 | 80 | 5 | 5 | 38.3 | -0.3 | -0.22 | 42.31 | -0.21 | -0.74 | 4.04 |
| 7 | 40 | 10 | 5 | 28.21 | -0.03 | 0.28 | 31.78 | 0.18 | -0.18 | 3.6 |
| 8 | 80 | 10 | 5 | 41.84 | -0.19 | -0.14 | 47.45 | -0.25 | -0.64 | 5.64 |
| 11 | 40 | 5 | 10 | 26.4 | -0.04 | -0.04 | 28.5 | -0.16 | -0.72 | 2.21 |
| 12 | 80 | 5 | 10 | 31.07 | -0.09 | -0.1 | 35.7 | -0.05 | -0.17 | 4.63 |
| 15 | 40 | 10 | 10 | 26.67 | 0.03 | -0.1 | 27.77 | -0.08 | -0.25 | 1.11 |
| 16 | 80 | 10 | 10 | 34.36 | 0.23 | 0 | 38.9 | -0.29 | -0.73 | 4.10 |

MULTI-LAYER THERMOPLASTIC FILMS AND BAGS CONFIGURED TO PROVIDE A PERCEIVABLE COLOR CHANGE UPON BEING SUBJECTED TO A STRAIN AND METHODS OF MAKING THE SAME

BACKGROUND

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many attempt to control manufacturing costs by decreasing the amount of thermoplastic material in a given product.

One way manufacturers may attempt to reduce production costs is to stretch the thermoplastic film, thereby increasing its surface area and reducing the amount of thermoplastic film needed to produce a product of a given size. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between pairs of smooth rollers. Commonly, MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

To MDO a film, manufacturers commonly heat the film to an elevated temperature and stretch the film in the machine direction. Commonly, manufacturers will stretch the thermoplastic film between approximately 300 to 500 percent of the film's original length or more.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. Often, incremental stretching of films is referred to as ring rolling.

Stretched films of reduced thickness can allow manufacturers to use less thermoplastic material to form a product of a given surface area or size. Reducing the gauge (i.e., thickness) of a film; however, can make the film more transparent or translucent. Consumers commonly associate thinner films and/or transparent films with weakness; and thus, may be dissuaded to purchase stretched films. Manufacturers may add colorants and/or additives, such as $TiO_2$ or voiding agents, to add either color and/or opacity to thinner films. Unfortunately, additives, such as $TiO_2$ and voiding agents can be expensive and/or often negatively impact the film strength properties, especially as the additive concentration is increased. Furthermore, many consumers prefer trash bags that appear to have multiple separate layers of films taking this as evidence of high quality trash bags.

Accordingly, there are a number of considerations to be made in thermoplastic films and manufacturing methods.

BRIEF SUMMARY

Some embodiments of the present disclosure include a multi-layer co-extruded film. The multi-layer co-extruded film may include a first layer having a first color and a second layer having a second color. The first and second layers may be co-extruded layers. Additionally, the first layer and the second layer may include a plurality of intermittently stretched regions and at least one thicker region when compared to the intermittently stretched regions. Furthermore, the multi-layer co-extruded film may exhibit a perceivable color change when subjected to a strain. The perceivable color change can provide an indication of strength to users and consumers of the film.

Additional embodiments of the present disclosure include a thermoplastic bag. The thermoplastic bag can include a first wall and a second wall joined along a bottom edge, a first side edge, and an opposing second side edge. Moreover, each of the first wall and the second wall can include a multi-layer co-extruded film having at least a first layer and a second layer. The first and second layers may be co-extruded layers. The first layer and the second layer may include a plurality of intermittently stretched regions and at least one thicker region. Furthermore, the multi-layer co-extruded film may exhibit a perceivable color change. For example, the multi-layer co-extruded film may exhibit a $\Delta E$ with a range of about 3.50 and about 5.85 when subjected to a strain.

Further embodiments of the present disclosure include method of forming a multi-layer co-extruded film. The method may include coextruding a first layer having a first color with a second layer having a second different color to form a multi-layer co-extruded film and intermittently stretching a plurality of regions of the multi-layer co-extruded film. Furthermore, the first layer and the second layer are co-extruded and intermittently stretched to exhibit a perceivable color change when subjected to a strain.

Additional features and advantages of will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figures 1A, 1B:
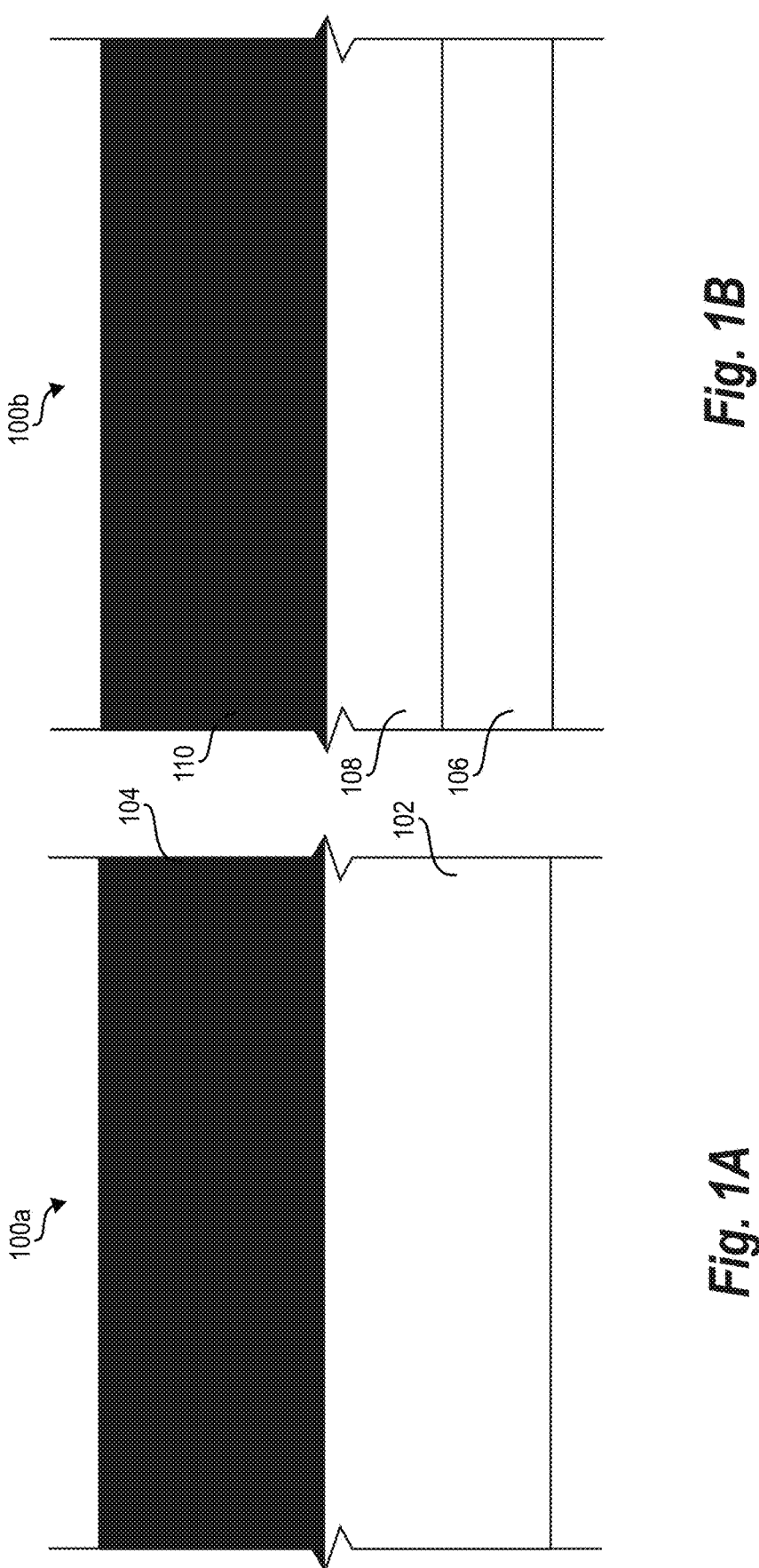
FIG. 1A shows a side view of a thermoplastic film having a first layer of a first color and a second layer of a second different color according to one or more embodiments of the present disclosure.
FIG. 1B shows a side view of a thermoplastic film having a first layer of a first color, a second layer of a second different color, and a third layer of the second different color according to one or more embodiments of the present disclosure.

One or more embodiments of the present disclosure include a multi-layer co-extruded film that exhibits a perceivable color change when subjected to a strain. In particular, the multi-layer film may include a first layer having a first color co-extruded with a second layer having a second color, and when the multi-layer film is subjected to a strain, the multi-layer film may exhibit a perceivable color change when viewing the multi-layer film from either layer.

Some embodiments of the present disclosure include a multi-layer film that includes a first black layer and a second white layer, and when the multi-layer film is subjected to a strain, the multi-layer film may exhibit a perceivable color change when viewing the multi-layer film from the first black layer. For example, portions of the multi-layer film may appear gray when subjected to the strain. In some instances, portions of the second white layer may show through the first black layer giving the first black layer a gray appearance.

As a result of the foregoing, when subjected to a strain (i.e., stretched by a consumer) the multi-layer film may give an appearance of a lighter colored film without requiring the actual colorant mixture of the lighter color to be within the multi-layer film. For example, the multi-layer film of the present disclosure may provide a film that has (i.e., mimics) a gray appearance (often a consumer preferred color) upon being subjected to a strain. Furthermore, the foregoing described color change may allow the multi-layer film to mimic a gray appearance without significantly increasing and/or reducing a transparency (i.e., light transmittance) of the multi-layer film. In other words, the foregoing described color change may allow the multi-layer film to mimic a gray appearance without detrimentally affecting an appearance of quality of the film. As a result of the foregoing, the multi-layer film of the present disclosure may provide a multi-layer film having a particular appearance (e.g., a gray appearance) while reducing costs.

Additionally, the multi-layer co-extruded film may imitate an appearance of a multiple layered film (i.e., a multiple layered partially discontinuously bonded film). In particular, because the white layer of the co-extruded film may appear to be viewable through the black layer upon being strained, the multi-layer film may appear to have multiple partially discontinuously bonded layers of film. Thus, the multi-layer co-extruded film of the present disclosure may give the appearance of the high-quality films without having the multiple partially discontinuously bonded layers. As a result, the multi-layer film may appear to a consumer to have a same quality as a film having multiple partially discontinuously bonded layers.

One or more embodiments of the present disclosure include products made from or with such multi-layer films. For example, such products include, but are not limited to, grocery bags, trash bags, sacks, and packaging materials, feminine hygiene products, baby diapers, adult incontinence products, or other products. For ease in description, the figures and bulk of the following disclosure focuses on films and bags. One will appreciate that teachings and disclosure equally applies to other products.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present disclosure, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the bond, fails.

The term laminate is also inclusive of co-extruded multilayer films comprising one or more tie layers. As a verb, "laminate" means to affix or adhere (by means of, for example, adhesive bonding, pressure bonding, ultrasonic bonding, corona lamination, static bonds, cohesive bonds, and the like) two or more separately made film articles to one another so as to form a multi-layer structure. As a noun, "laminate" means a product produced by the affixing or adhering just described.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present disclosure is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present disclosure.

Some embodiments of the present disclosure may include any flexible or pliable thermoplastic material that may be formed or drawn into a web or film. Furthermore, the thermoplastic materials may include a single layer or multiple layers as described in further detail below in regard to FIGS. 1A-1B. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

Additional additives that may be included in one or more embodiments include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films to be used with the present disclosure using a wide variety of techniques. For example, a manufacturer can form precursor mix of the thermoplastic material and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more embodiments, a manufacturer can use multiple extruders to supply different melt streams, which a feed block can order into different channels of a multi-channel die. The multiple extruders can allow a manufacturer to form a multi-layer film with layers having different compositions. Such multi-layer film may later be non-continuously laminated with another layer of film to provide the benefits of the present disclosure.

In a blown film process, the die can be an upright cylinder with a circular opening. Rollers can pull molten thermoplastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, ultrasonic bonding, and combinations thereof. Adjacent layers of an individual film may be co-extruded. Coextrusion results in tight bonding so that the bond strength is greater than the tear resistance of the resulting laminate (i.e., rather than allowing adjacent layers to be peeled apart through breakage of the lamination bonds, the film will tear).

As used herein, any relational terms such as "first," "second," and "third," "inner," "outer," "upper," "lower," "side," "top," "bottom," etc. are for clarity and convenience in understanding the present disclosure and accompanying drawings and does not connote or depend on any specific preference, orientation, or order, except where the context clearly indicates otherwise. For example, the relational terms may refer an orientation of a multi-layer bag while disposed within a receptacle (e.g., a trash can) for use.

FIG. 1A shows a partial side view of a multi-layer film ply 100a (herein after "multi-layer film"). As shown, in some embodiments, the multi-layer film 100a can include a first layer 102 and a second layer 104. For example, the multi-layer film 100a can include a bi-layered film. Furthermore, the multi-layer film 100a can include co-extruded layers. For instance, the first layer 102 and the second layer 104 may be co-extruded. The first and second layers 102, 104 can optionally include different grades of thermoplastic material or include different additives, including polymer additives.

In additional embodiments, as shown in FIG. 1B, a multi-layer film 100b can include three layers (i.e., a tri-layered film). In particular, as shown in FIG. 1B, the multi-layer film 100b can include a first layer 106, a second layer 108, and a third layer 110. Furthermore, in some instances, the multi-layer film 100b can include a three-layer A:A:B structure. In some embodiments, the ratio of the layers may be 20:20:60. For example, the first and second layers 106, 108 may comprise about 40% of the multi-layer film 100b by thickness. In alternative embodiments, the ratio of the layer may be 40:40:20. For example, the first and second layers 106, 108 may comprise about 80% of the multi-layer film 100*b* by thickness. In further embodiments, the ratio of the layer may be 15:70:15. Moreover, in other embodiments, the multi-layer film 100*b* can include a three-layer A:B:A structure, a three-layer B:A:B structure, or a three-layer B:B:A structure. In still further embodiments, the multi-layer film can comprise any number of co-extruded layers. More particularly in one or more embodiments, the multi-layer film can comprise any number of co-extruded layers so long as the A and B layers do not alternate such that the A layers are on one side and the B layers are on the other side. In still further embodiments, the multi-layer film can comprise one or more co-extruded layers between the A and B layers. For example, the multi-layer film can comprise clear or transparent layers between the A and B layer(s). In still further embodiments, the multi-layer film can comprise intermittent layers of different colors in addition to the A and B layer(s).

As described in greater detail below, the ratio of the A and B layers can affect the amount of perceivable color change that the film undergoes when subjected to a strain. Also, the concentrations of colorant in the A and B layers can affect the amount of perceivable color change that the film undergoes when subjected to a strain. More particular, the combination of the ratio of the A and B layers and the concentrations of colorant in the A and B layers affect the amount of perceivable color change that the film undergoes when subjected to a strain.

In one or more embodiments, the A layers comprise a light colorant while the B layers comprise a dark colorant. As used herein a light colorant is a color with a brightness closer to the brightness of white than the brightness of black. As used herein a dark colorant is a color with a brightness closer to the brightness of black than the brightness of white. In one or more embodiments, the A layers have a concentration of light colorant between about 1% by mass and about 15% by mass. More particularly, in one or more embodiments, the A layers have a concentration of light colorant between about 2% by mass and about 12% by mass. In still further embodiments, the A layers have a concentration of light colorant between about 5% by mass and about 10% by mass.

In one or more embodiments, the B layers have a concentration of dark colorant between about 1% by mass and about 15% by mass. More particularly, in one or more embodiments, the B layers have a concentration of dark colorant between about 2% by mass and about 12% by mass. In still further embodiments, the B layers have a concentration of dark colorant between about 5% by mass and about 10% by mass.

In one or more embodiments, the A layers (i.e., 106, 108) can comprise a mixture of hexene LLDPE of density 0.918 and metallocene LLDPE of density 0.910. The A layers 106, 108 can also include a light colorant (i.e., pigment). For example, the A layers can include a colorant containing white TiO2, resulting in a white colored film. In such embodiments, the A layers 106, 108 may include a white colorant in an amount between about 0.1 percent and about 15% by mass. More particularly, the A layers 106, 108 may include a white colorant in an amount between about 3% and about 12% by mass or about 5% and about 10% by mass resulting a white film.

The B layer (110) can comprise a mixture of hexene LLDPE of density 0.918, butene LLDPE of density 0.918, reclaimed resin from trash bags. Additionally, the B layer 110 can include an opacity agent. For example, the B layer 110 can include a dark colorant (i.e., a colorant). In particular, the B layer 110 can include carbon black in an amount between about 0.1 percent and about 15% by mass. More particularly, the B layer 110 can include a colorant containing carbon black in an amount between about 3% and about 12% by mass or about 5% and about 10% by mass resulting black film. In one or more implementations, the LLDPE can comprise greater than 50% of the overall thermoplastic material in the multi-layer film 100*b*.

Referring still to FIG. 1B, in yet further embodiments, the multi-layer film 100*b* is a co-extruded three-layer C:A:B structure where the ratio of layers is 20:60:20. The C layer 106 can comprise a LLDPE material with a first colorant (e.g., black or white). The B layer 110 can also comprise a LLDPE material with a second colorant (e.g., black or white). The LLDPE material can have a MI of 1.0 and density of 0.920 g/cm3. The A layer 108 can comprise similar materials to any of the A layers described above. Furthermore, the A layer 108 can comprise a white colorant. Each of the implementations of the film 100*b* describe above can comprise three layers that are co-extruded.

In alternative implementations, the multi-layer film can comprise a first layer and a second layer that are co-extruded layers. The first and second co-extruded films can each comprise a different colorant, and thus, a different color. As an example, one layer can comprise white and another layer can comprise black. Alternatively, one layer can comprise white and another layer can comprise a pearlescent white. Other embodiments can comprise any combination of different colors. Furthermore, the multi-layer film can comprise one or more additional layers that are not co-extruded with the first and second co-extruded layers. For example, the multi-layer film can comprise a third layer that is discontinuously laminated to the first and second co-extruded layers. In one or more embodiments, the third layer can comprise a transparent or translucent film.

Figure 2:
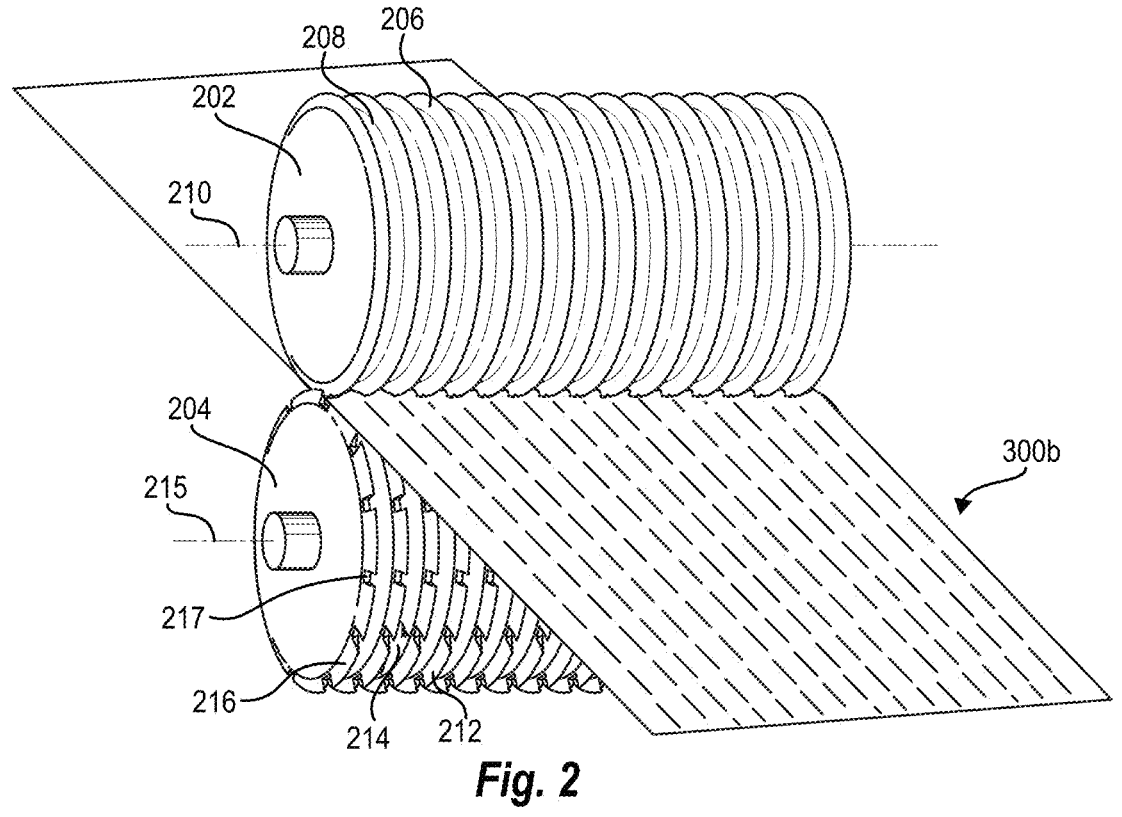
FIG. 2 illustrates a perspective view of a pair of SELF'ing rollers and a thermoplastic multi-layer film passing through the pair SELF'ing rollers according to one or more embodiments of the present disclosure.

FIG. 2 shows a pair of SELF'ing intermeshing rollers 202, 204 (e.g., a first SELF'ing intermeshing roller 202 and a second SELF'ing intermeshing roller 204) for creating strainable networks with intermittently stretched regions in a multi-layer film 300*b*. As will be described in greater detail below, the intermittently stretched regions may enable the multi-layer film to exhibit a perceivable color change when subjected to a strain. As shown in FIG. 2, the first SELF'ing intermeshing roller 202 may include a plurality of ridges 206 and grooves 208 extending generally radially outward in a direction orthogonal to an axis of rotation 210. As a result, the first SELF'ing intermeshing roller 202 can be similar to a transverse direction ("TD") intermeshing roller such as the TD intermeshing rollers described in U.S. patent application Ser. No. 13/299,177 to Broering et al., the disclosure of which is incorporated in its entirety by reference herein. The second SELF'ing intermeshing roller 204 can include also include a plurality of ridges 212 and grooves 214 extending generally radially outward in a direction orthogonal to an axis of rotation 215. As shown in FIG. 2, in some embodiments, the ridges 216 of the second SELF'ing intermeshing roller 204 may include a plurality of notches 217 that define a plurality of spaced teeth 216.

Figure 3:
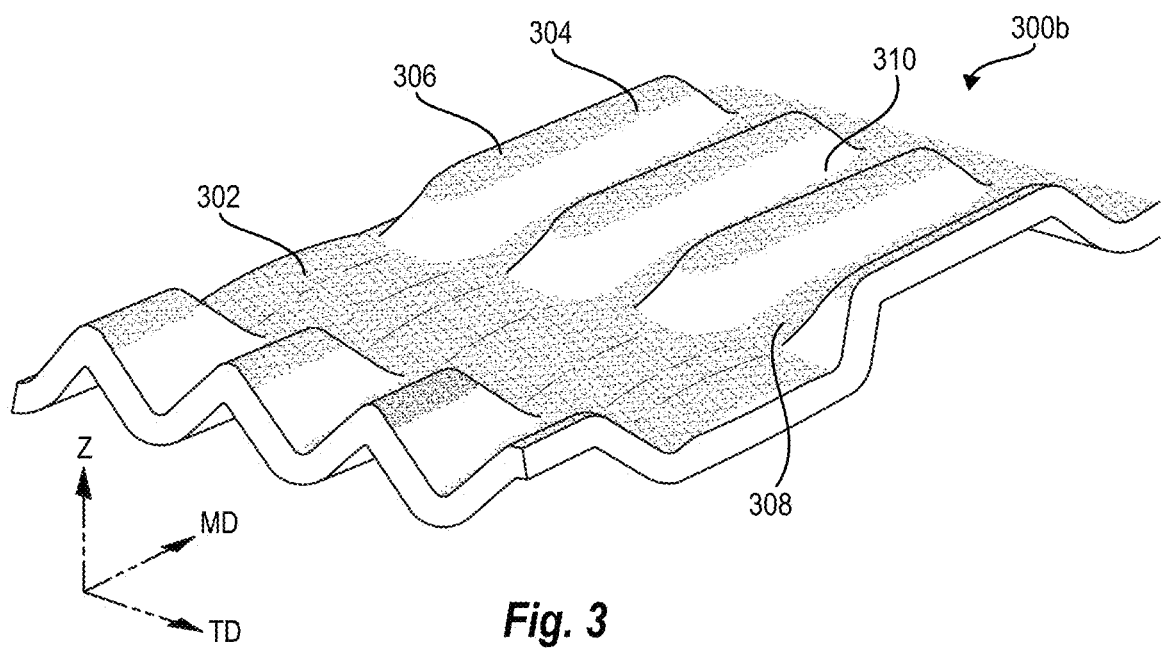
FIG. 3 shows a multi-layer film that has been intermittently stretched with the SELF'ing rollers of FIG. 2 according to one or more embodiments of the present disclosure.

FIG. 3 shows a SELF'd multi-layer film 300*b* that may exhibit a perceivable color change when subjected to a strain according to one or more embodiments of the present disclosure. Referring to FIGS. 2 and 3 together, as the multi-layer film (e.g., multi-layer film 100*b*) passes through the SELF'ing intermeshing rollers 202, 204, the teeth 216 can press a portion of the multi-layer film 300*b* out of plane defined by the multi-layer film 300*b* to cause permanent deformation of a portion of the multi-layer film 300*b* in the Z-direction. For example, the teeth 216 can intermittently stretch a portion of the multi-layer film 300*b* in the Z-direction. The portions of the multi-layer film 300*b* that pass between the notched regions 217 of the teeth 216 will remain substantially unformed in the Z-direction. As a result of the foregoing, the SELF'd multi-layer film 300*b* includes a plurality of isolated deformed, raised, rib-like or rib elements 304 (i.e., rib regions) and at least one un-deformed portion 302 (e.g., a relatively flat region). As will be understood by one of ordinary skill in the art, the length and width of the rib-like elements 304 depend on the length and width of teeth 216 and the speed and the depth of engagement of the intermeshing rollers 202, 204. The rib-like elements 304 and the un-deformed portions 302 of the multi-layer film 300*b* form a strainable network.

As shown in FIG. 3, the strainable network of the multi-layer film 300*b* can include first thicker regions 306, second thicker regions 308, and stretched, thinner transitional regions 310 connecting the first and second thicker regions 306, 308. The first thicker regions 306 and the stretched, thinner regions 310 can form the raised rib-like elements 304 of the strainable network.

The rib-like elements 304 can allow the multi-layer film 300*b* to undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations of multi-layer film 300*b* that are generally discernible to the normal naked eye when the multi-layer film 300*b* or articles embodying the multi-layer film 300*b* are subjected to an applied strain. Types of geometric deformation include, but are not limited to bending, unfolding, and rotating.

Thus, upon application of strain, the rib-like elements 304 can undergo geometric deformation before either the rib-like elements 304 or the flat regions 302 undergo molecular-level deformation. For example, a strain applied the multi-layer film 300*b* in a direction parallel to the flat regions 302 of the multi-layer film 300*b* can pull the rib-like elements 304 back into plane with the flat regions 302 prior to any molecular-level deformation of the multi-layer film 300*b*. Geometric deformation can result in significantly less resistive forces to an applied strain than that exhibited by molecular-level deformation. Furthermore, as is described in greater detail below in regard to FIG. 6, upon application of strain to the multi-layer film 300*b*, the strainable network of the multi-layer film 300*b* can exhibit a perceivable color change on and/or proximate to the rib-like elements 304 of the strainable network.

Figure 4A:
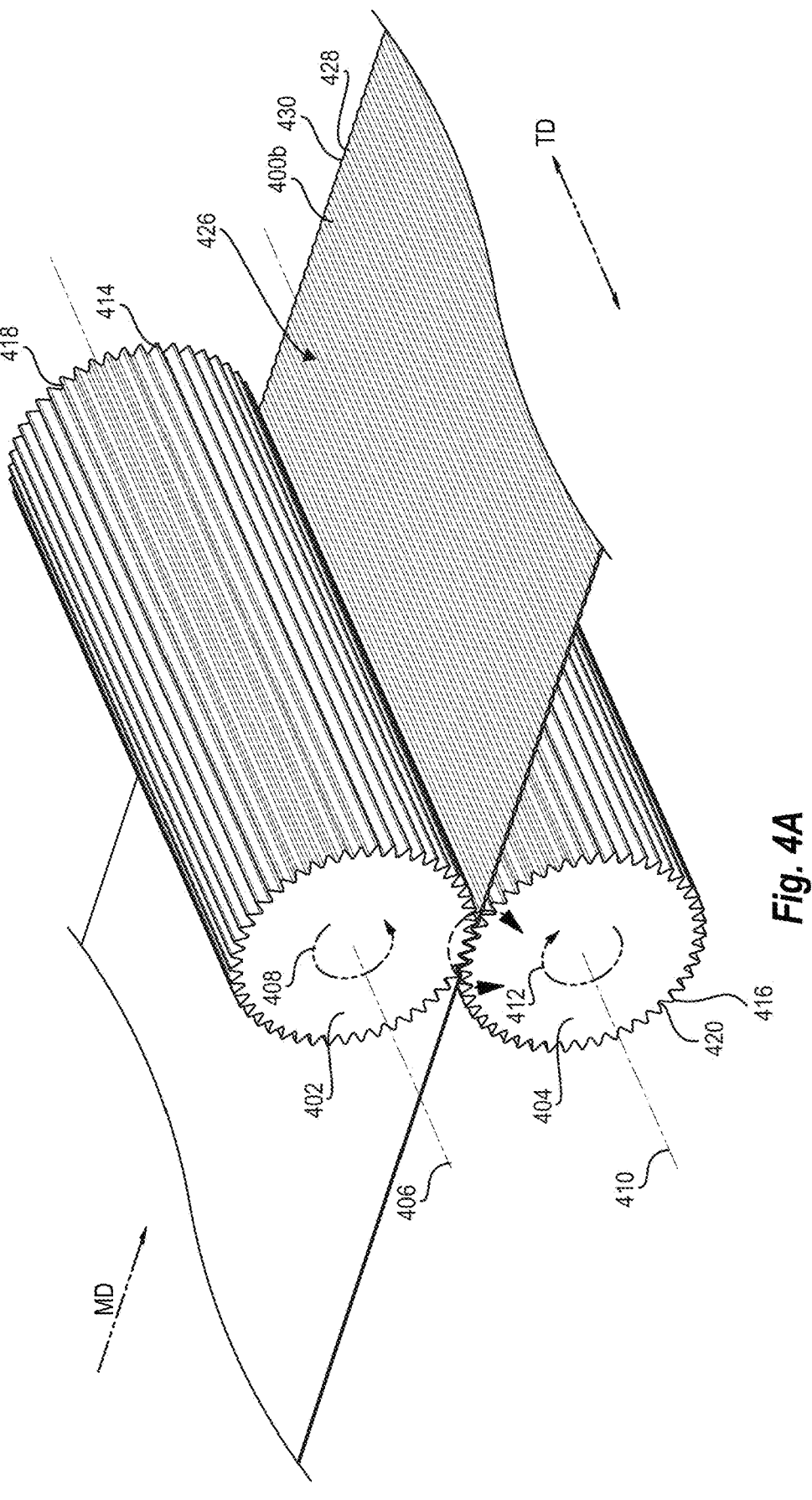
FIG. 4A shows a pair of MD intermeshing rollers and a thermoplastic multi-layer film passing through the of MD pair intermeshing rollers according to one or more embodiments of the present disclosure.
Figure 4B:
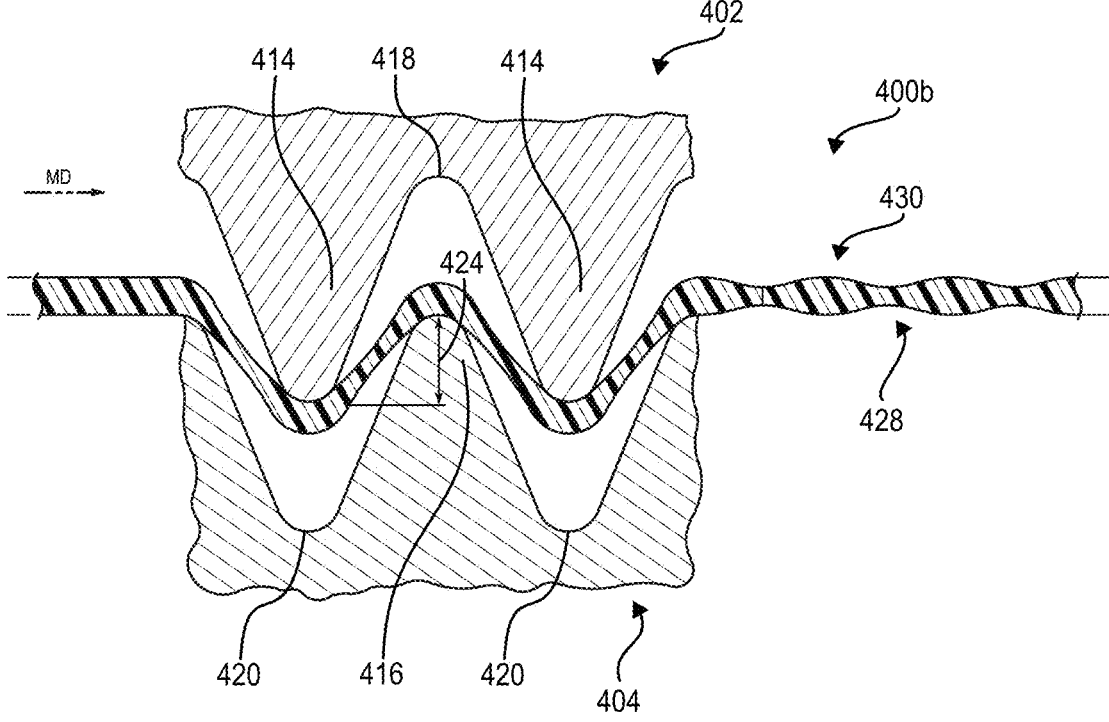
FIG. 4B shows a multi-layer film that has being intermittently stretched with intermeshing rollers of FIG. 4A according to one or more embodiments of the present disclosure.

FIGS. 4A-4B shows additional processes of intermittently stretching a multi-layer film according to another embodiment of the present disclosure. In particular, FIGS. 4A-4B illustrate an MD ring rolling process that intermittently stretches a multi-layer film 400*b* in the machine direction (MD) or in other words the direction in which the films were extruded by passing the multi-layer film 400*b* through a pair of MD intermeshing rollers 402, 404 (e.g., a first roller 402 and a second roller 404). For example, the process may include any of the rolling processes that intermittently stretches a film as described in U.S. patent application Ser. No. 13/289,829 to Borchardt, the disclosure of which is incorporated in its entirety by reference herein.

As shown by the FIGS. 4A-4B, each of the first roller 402 and the second roller 404 may have a generally cylindrical shape. In some embodiments, the MD intermeshing rollers 402, 404 may comprise cast and/or machined metal, such as, e.g., steel, aluminum, or any other suitable material. In operation, the MD intermeshing rollers 402, 404 can rotate in opposite directions about parallel axes of rotation. For example, as shown in FIG. 4A, the first roller 402 can rotate about a first axis 406 of rotation in a counterclockwise direction 408. FIG. 4A also illustrates that the second roller 404 can rotate about a second axis 410 of rotation in a clockwise direction 412. The axes of rotation 406, 410 can be parallel to the transverse direction (TD) and perpendicular to the machine direction MD.

The intermeshing rollers 402, 404 can closely resemble fine pitch spur gears. In particular, the MD intermeshing rollers 402, 404 can include a plurality of protruding ridges 414, 416 extending radially outward from the axes of rotation 406, 410 of the intermeshing rollers 402, 404. The ridges 414, 416 can defined grooves 418, 420 between adjacent ridges 414, 416. For example, grooves 418, 420 can separate adjacent ridges 414, 416. The ridges 414, 416 can extend along the MD intermeshing rollers 402, 404 in a direction generally parallel to axes of rotation 406, 410 and perpendicular to the machine direction of the multi-layer film 400*b* passing through the MD intermeshing rollers 402, 404. The ridges 414, 416 can include tips, and the tips of ridges 414, 416 can have a variety of different shapes and configurations. For example, the tips of the ridges 414, 416 can have a rounded shape as shown in FIG. 4B. In alternative implementations, the tips of the ridges 414, 416 can have sharp angled corners.

The ridges 414 on the first roller 402 can be offset or staggered with respect to the ridges 416 on the second roller 404. Thus, the grooves 418 of the first roller 402 can receive the ridges 416 of the second roller 404, as the MD intermeshing rollers 402, 404 intermesh. Similarly, the grooves 420 of the second roller 404 can receive the ridges 414 of the first roller 12.

One will appreciate in view of the disclosure herein that the configuration of the ridges 414, 416 and grooves 418, 420 can prevent contact between ridges 414, 416 during intermeshing so that no rotational torque is transmitted during operation. Additionally, the configuration of the ridges 414, 416 and grooves 418, 420 can affect the amount of intermittent stretching as the film passes through MD intermeshing rollers 402, 404.

Referring specifically to FIG. 4B, various features of the ridges 414, 416 and grooves 418, 420 are shown in greater detail. The pitch and depth of engagement of the ridges 414, 416 can determine, at least in part, the amount of incremental stretching caused by the MD intermeshing rollers 402, 404. As shown by FIG. 4B, the pitch 422 is the distance between the tips of two adjacent ridges on the same roller. The "depth of engagement" ("DOE") 424 is the amount of overlap between ridges 414, 416 of the different MD intermeshing rollers 402, 404 during intermeshing. According to one embodiment, the ratio of DOE to pitch provided by any ring rolling operation is less than about 1.1:1, suitably less than about 1.0:1, suitably between about 0.5:1 and about 1.0:1, or suitably between about 0.8:1 and about 0.9:1.

As shown by FIG. 4A, the direction of travel of the multi-layer film 400*b* through the MD intermeshing rollers 402, 404 is parallel to the machine direction and perpendicular to the transverse direction. As the multi-layer film 400*b* passes between the MD intermeshing rollers 402, 404, the ridges 414, 416 can intermittently stretch the multi-layer film 400*b* in the machine direction. In one or more implementations, stretching the multi-layer film 400*b* in the machine direction can reduce the gauge of the film and increase the length of the multi-layer film 400*b*. In other implementations, the multi-layer film 400*b* may rebound after stretching such that the gauge of the multi-layer film 400*b* is not decreased. Furthermore, in one or more implementations, stretching the multi-layer film 400*b* in the machine direction can reduce the width of the multi-layer film 400*b*. For example, as the multi-layer film 400*b* is lengthened in the machine direction, the film's length can be reduced in the transverse direction.

In particular, as the multi-layer film 400*b* proceeds between the MD intermeshing rollers 402, 404, the ridges 414 of the first roller 402 can push the multi-layer film 400*b* into the grooves 420 of the second roller 404 and vice versa. The pulling of the multi-layer film 400*b* by the ridges 414, 416 can stretch the multi-layer film 400*b*. The MD intermeshing rollers 402, 404 may not stretch the multi-layer film 400*b* evenly along its length. Specifically, the MD intermeshing rollers 402, 404 can stretch the portions of the film 400*b* between the ridges 414, 416 more than the portions of the multi-layer film 400*b* that contact the ridges 414, 416. Thus, the MD intermeshing rollers 402, 404 can impart or form a generally striped pattern 426 into the multi-layer film 13. As used herein, the terms "impart" and "form" refer to the creation of a desired structure or geometry in a film upon stretching the film that will at least partially retain the desired structure or geometry when the film is no longer subject to any strains or externally applied forces.

As seen in FIG. 4A, upon stretching, the stretched multi-layer film can include a striped pattern 426. The striped pattern 426 can include alternating series of stretched (or more stretched) regions or thinner webs 428 adjacent to thicker regions (or less stretched) or ribs 430.

While FIGS. 4A-4B illustrate MD intermeshing rollers and an MD incrementally stretched film, other embodiments can comprise TD intermeshing rollers or helical intermeshing rollers to create TD incrementally stretched or helically incrementally stretched films. The helical intermeshing rollers can have teeth oriented between 1 degree and 89 degrees relative to an axis of rotation of the helical intermeshing rollers. Still further embodiments comprise MD and TD incrementally stretched films.

Figure 5:
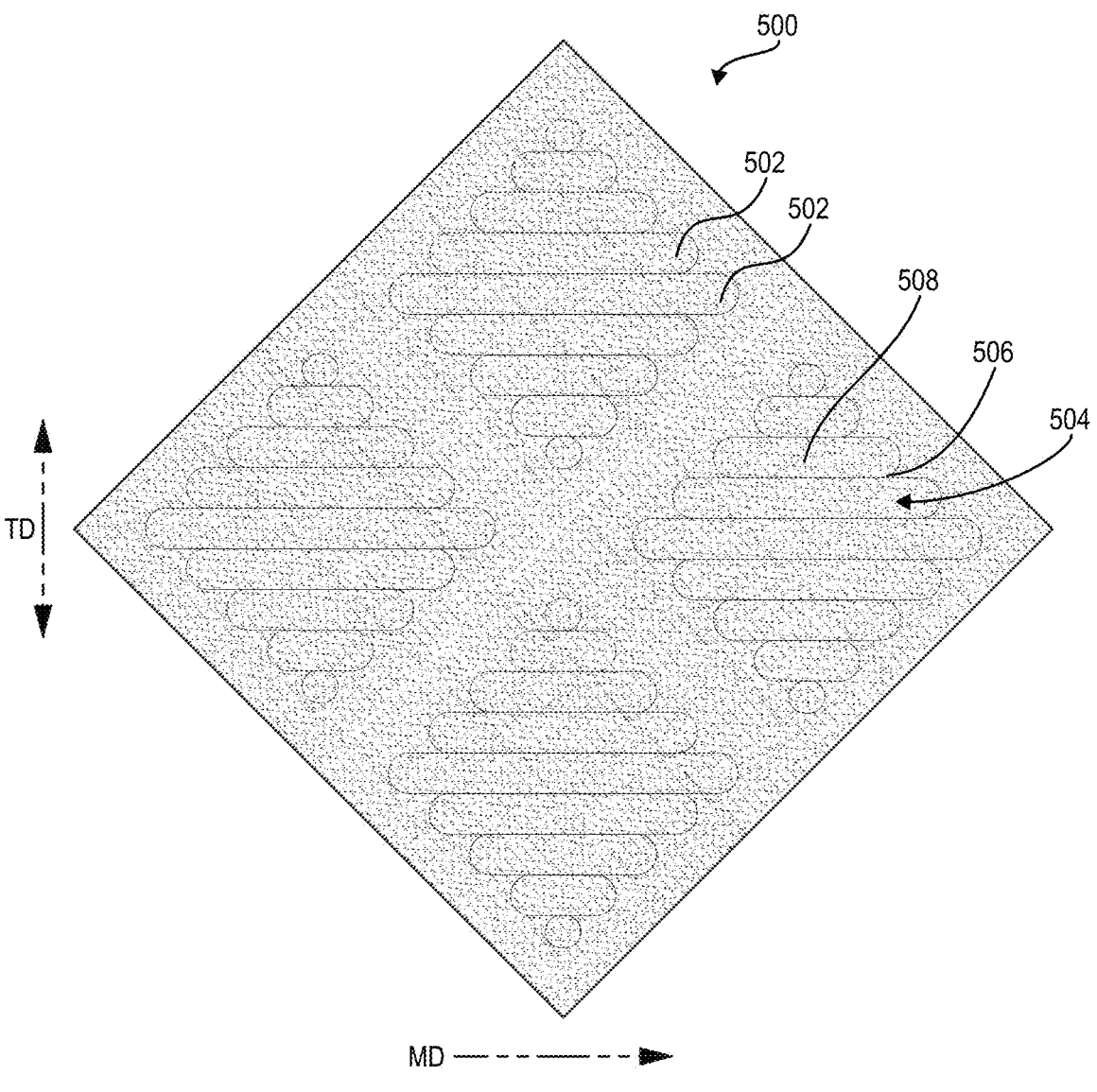
FIG. 5 shows a thermoplastic film having a strainable network according to one or more embodiments of the present disclosure.

FIG. 5 illustrates a multi-layer film 500 with a strainable network of rib-like elements 502 arranged in diamond patterns. The strainable network of the multi-layer film 500 can include first thicker regions 504, second thicker regions 506, stretched, thinner transitional regions 508 connecting the first and second thicker regions 504, 506. The first thicker regions 504 and the stretched, thinner regions 508 can form the raised rib-like elements 502 of the strainable network.

One or more implementations of the present invention can include strainable network patterns other than those shown by FIGS. 3-5, or combinations of various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine nor transverse directions.

In addition to ring rolling and SELF'ing, one or more implementations include using embossing, stamping, or other methods of processing a multilayer film. In such implementations, one or more of the layers of the multi-layer film can be stretched to reduce the basis weight and/or modify the strength parameters of the film. Stretching of the individual layers can include intermittently-stretching (e.g., ring rolling, SELF'ing) and optionally continuous stretching (e.g., MDO).

Figure 6:
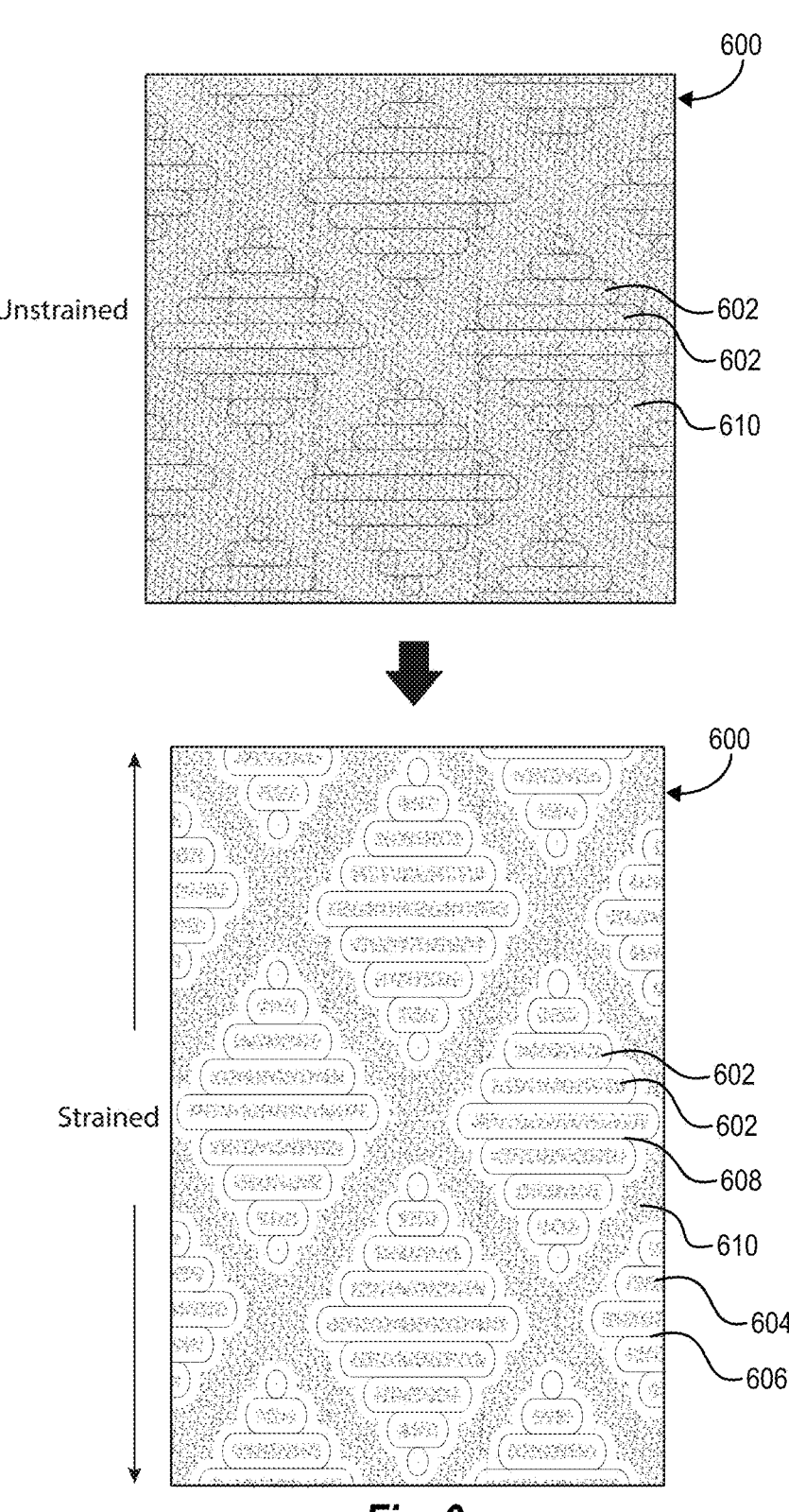
FIG. 6 shows a thermoplastic film being subjected to a strain according to one or more embodiments of the present disclosure.

FIG. 6 shows an example multi-layer film 600 of the present disclosure exhibiting a color change when subjected to a strain. As shown in FIG. 6, the multi-layer film 600 may include the strainable network of rib-like elements 602 arranged in diamond patterns, as described above in regard to FIG. 5. Furthermore, the multi-layer film 600 may include at least one un-deformed region 610 (e.g., a flat region).

In some embodiments, when the multi-layer film 600 is subjected to a strain in direction parallel to a plane defined by the un-deformed regions of the multi-layer film, the multi-layer film 600 may exhibit a perceivable color change. For example, in some instances, the multi-layer film 600 can exhibit a perceivable color change ($\Delta E$) (indicated by white areas in stretched film at the bottom of FIG. 6) within a range of 3.50 and about 5.85. In some instances, the multi-layer film 600 can exhibit a perceivable color change ($\Delta E$) of about 5.64. In other instances, the multi-layer film 600 can exhibit a perceivable color change ($\Delta E$) of 3.60.

In the foregoing algorithm, a represents a measurement of green and magenta values, b represents a measurement of blue and yellow values, and L represents a measurement of lightness (i.e., white and back values). In some embodiments, the perceivable color change may include a perceivable change of color from black to gray. In additional embodiments, the perceivable color change may include a perceivable change of color from a first relatively darker color to a second relatively lighter color. For example, the perceivable color change may include perceivable change of color from a first darker gray to a second light gray. In other embodiments, the perceivable color change may include perceivable change of color from a first darker version of any color to a second lighter version of the same color.

In some instances, the multi-layer film 600 may exhibit the color change ($\Delta E$) on and/or proximate to the strainable network of rib-like elements 602. In particular, in some embodiments, the multi-layer film 600 may exhibit the color change ($\Delta E$) at the stretched, thinner transitional regions 608 (e.g., thinner transitional regions 310 (FIG. 3)) of the rib-like elements 602. In other embodiments, the multi-layer film 600 may exhibit the color change ($\Delta E$) at the first thicker regions 604 and second thicker regions 606 of the rib-like elements 602. In yet further embodiments, the multi-layer film 600 may exhibit the color change ($\Delta E$) at both of the first and second thicker regions 604, 606 and the stretched, thinner transitional regions 608.

In one or more embodiments, the multi-layer film 600 may exhibit the above-described color change when subjected to a strain within a range of about 5% to 100%. In some embodiments the multi-layer film 600 may exhibit the above-described color change when subjected to a strain within a range of 40% to about 60%. In some embodiments, the multi-layer film 600 may exhibit the above-described color change when subjected to a strain within a range of about 45% to about 55%. In particular, the multi-layer film 600 may exhibit the above-described color change when subjected to a strain of about 47%. One will appreciate in light of the disclosure herein that the amount of color change can vary based on the amount of applied strain.

The foregoing described color change may give the multi-layer film 600 the appearance of a lighter colored film without requiring the actual colorant mixture of the lighter color to be within the multi-layer film 600. For example, it may allow a film having a viewable black layer (with a back white layer) to have (i.e., mimic) a gray appearance (often a consumer preferred color) upon being subjected to a strain. Furthermore, the foregoing described color change may allow the film to mimic a gray appearance without significantly increasing and/or reducing a transparency (i.e., light transmittance) of the film. In other words, the foregoing described color change may allow the film to mimic a gray appearance without detrimentally affecting an appearance of quality of the film. As a result of the foregoing, the multi-layer film 600 of the present disclosure may provide a multi-layer film having a particular appearance (e.g., a gray appearance) while reducing costs.

As another example, it may allow a film having a viewable blue layer (with a back yellow layer) to have (i.e., mimic) a green appearance upon being subjected to a strain. Furthermore, the foregoing described color change may allow the film to mimic a green appearance without significantly increasing and/or reducing a transparency (i.e., light transmittance) of the film. In other words, the foregoing described color change may allow the film to mimic a green appearance without detrimentally affecting an appearance of quality of the film. As a result of the foregoing, the multi-layer film of the present disclosure may provide a multi-layer film having a particular appearance (e.g., a green appearance) while reducing costs. One will appreciate that other color combination in addition to white/black producing grey and yellow/blue producing green are possible and the foregoing are provide by way of example and not limitation.

Additionally, the multi-layer film 600 may imitate an appearance of a multiple layered film (i.e., a multiple layered partially discontinuously bonded film) comprising differently colored films. In particular, because the white layer of the co-extruded film may appear to be viewable through the black layer upon being strained, the multi-layer film may appear to have multiple partially discontinuously bonded layers of film. Thus, the multi-layer film of the present disclosure may give the appearance of the high quality films without having the multiple partially discontinuously bonded layers. As a result, the multi-layer film may appear to a consumer to have a same quality as a film having multiple partially discontinuously bonded layers. Still further, the color change can have the effect of making the rib-like elements 602 more noticeable to a viewer of the film. Thereby providing a connotation of strength to the viewer.

Figures 7, 8:
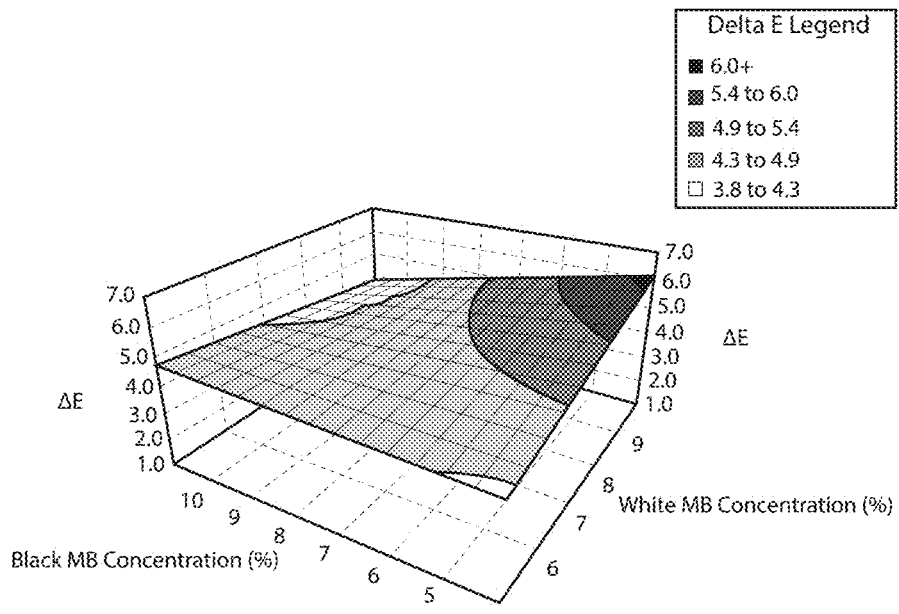
FIG. 7 shows a table includes test results of testing performed by the inventors.
FIG. 8 includes a representation of 3D graph showing change in color values of multi-layer films according to one or more embodiments of the present disclosure.

The following example presents the results of a series of tests performed on multi-layer films. These examples are illustrative of the embodiments described herein and should not be construed to limit in any way the scope of the invention. In particular, FIG. 7 shows a table showing color space coordinates (i.e., CIELAB color space coordinates) measured for a plurality of multi-layer films in a relaxed state (i.e., not subjected to a strain) and when subjected to a 47% strain. Furthermore, the table shows a ΔE (i.e., perceivable color change) caused by the strain in each of the plurality of multi-layer films.

The film gauge was held constant at 0.75 mils. The eight films were made on laboratory extrusion tower equipped with a three-layer die, in a A:A:B layer configuration, with the A layer being white and the B layer black. The screw speeds of each extruder were adjusted to achieve the desired layer ratios. The line speed was held constant at a nominal 150 feet/min. The white colorant was added via an 80% TiO2 loaded masterbatch. The black colorant was added via a 55% carbon black loaded masterbatch. The base resin was a blend of conventional LLDPE polyethylenes. All films were wound on rolls in extrusion and the rolls transferred to the process that imparted the SELF'ing pattern. The SELF'ing was performed on all films at 28 mils DOE. Specimens of each SELF'ed film were collected and their color was measured.

To measure the color, two 7" MD×8" TD two layer samples of each film were cut and the films oriented to have the black layers facing outward (and the white layers (having grey appearance facing each other). The color of each film was measured at three different places on the SELF'ed region in a relaxed state and then again when subjected to 47% strain using a BYK Gardner Spectro Guide, Catalog #6834, with D65 Illuminate and a 10° observer. The BYK Gardner unit provides CIELAB L*, a*, b* standardized color space coordinates that can be used to calculate the difference in color between specimens using the formula:

$$\Delta E^* = [(\Delta a^*)^2 + (\Delta b^*)^2 + (\Delta L^*)^2]^{1/2}$$

In general, a typical human being can detect a ΔE of 1.0.

The strain was imparted to the films using an internally designed apparatus having a fixed clamp and a movable clamp on a slide. The slide had a $\frac{3}{16}$" hole in which a pin could be place into matching holes in the base, allowing us to lock the slide in position while the color measurement was made. The distance between the clamps prior to stretching was 4.25". Each sample was stretched 2.00" in the transverse direction, resulting in a (6.25/4.25−1)=47% strain.

As shown in FIG. 7, the multi-layer film that experienced the greatest ΔE included a white layer ratio ("LR") of 80% with the white layer having a white colorant concentration of 10% by mass and a black layer having a black colorant concentration of 5% by mass. In particular, the multi-layer film exhibited a ΔE of about 5.64. Furthermore, the multi-layer film that experienced the least ΔE included a white layer ratio ("LR") of 40% with the white layer having a white colorant concentration of 10% by mass and a black layer having a black colorant concentration of 10% by mass. In particular, the multi-layer film exhibited a ΔE of about 1.11.

Figure 9:
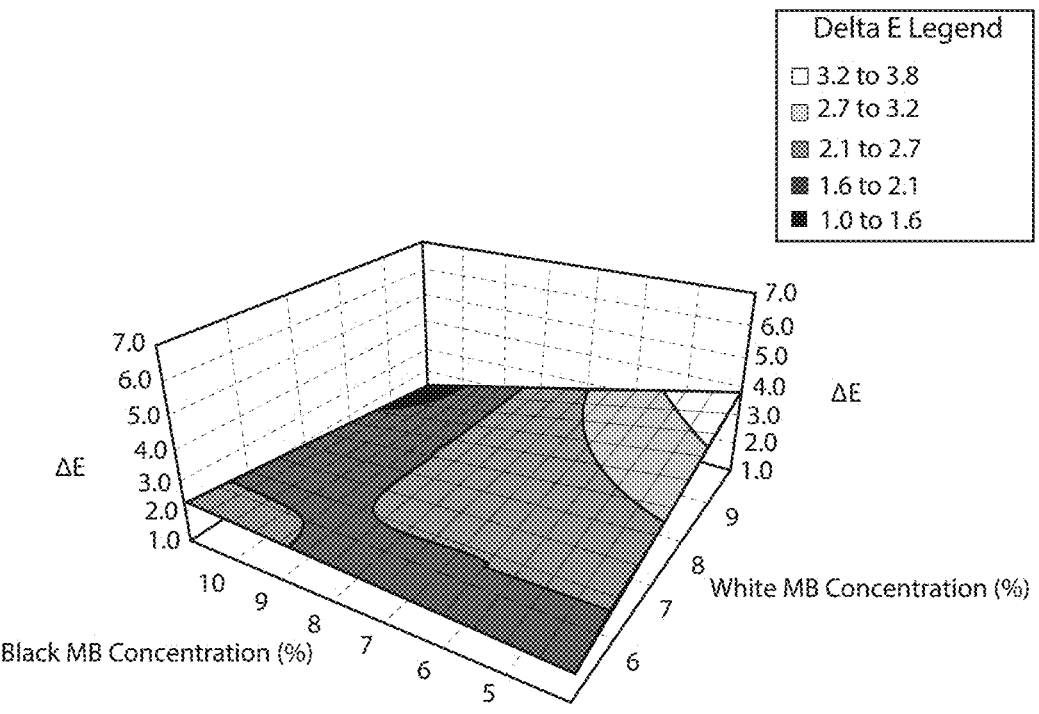
FIG. 9 includes a representation of another 3D graph showing change in color values of multi-layer films according to one or more embodiments of the present disclosure.

To quantify the results of FIG. 7, a regression equation was fit to the data to model the ΔE responses from the experiment. The result was:

$$\Delta E = 3.502 + 1.232 \times X_A + 0.243 \times X_B - 0.356 \times X_C - 0.518 \times X_{BC} \; R^2_{ADJ} = 88.5\%$$

Where $X_A$, $X_B$, and $X_C$ are standardized factors representing the white layer ratio, white MB concentration, and black MB concentration respectively. The standardizing transformations are $X_A$=(White Layer Ratio−60)/20; $X_B$=(White MB Conc.−7.5)/2.5; $X_C$=(Black MB Conc.−7.5/5. The $R^2_{ADJ}$ value indicates the model explains 88.5% of the variability in the response (ΔE). FIGS. 8 and 9 are two surface plots of the equation that help show how the factors (ratio of the layers, white concentration percentage, and black concentration percentage) affect the ΔE.

FIG. 8 includes a perspective view of a 3D graph shows the perceivable color changes (ΔE) of the table of FIG. 7 for multi-layer films having a white layer ratio of 80% when subjected to a 47% strain. In particular, FIG. 8 shows a complex surface with the ΔE dipping (i.e., dropping) when both the white colorant concentrations and the black colorant concentrations are at 5% and again when the white and black colorant concentrations are at 10%. For example, as shown in FIG. 8, when the multi-layer film includes a white layer having a white colorant concentration of 10% (i.e., 10% by mass) and a black layer having a black colorant concentration of 10% (i.e., 10% by mass), the multi-layer film exhibits a ΔE of about 4.10. Additionally, when the multi-layer film includes a white layer having a white colorant concentration of 5% (i.e., 5% by mass) and a black layer having a black colorant concentration of 10% (i.e., 10% by mass), the multi-layer film exhibits a $\Delta E$ of about 4.63.

One of ordinary skill in the art will appreciate in light of the disclosure herein that this is an unexpected result, as a film having a higher concentration of white colorant would be expected to exhibit a higher $\Delta E$ when strained when compared to a film having a lower concentration of white colorant. That is, one of ordinary skill in the art would expect a film having a layer having a whiter white color (e.g., more colorant) to show through the black layer more vibrantly when strained, thus, resulting a greater $\Delta E$, than a layer having a duller white color (i.e., less white colorant). In other words, one of ordinary skill in the art would anticipate the black to white colorant concentrations to follow a simple linear relationship. However, as illustrated in the graph of FIG. 8, this is not the case. Thus, the foregoing finding is unexpected. Furthermore, the needed ratios of the color colorants to achieve a color change are not readily anticipated.

FIG. 9 includes a perspective view of a 3D graph shows the perceivable color changes ($\Delta E$) of the table of FIG. 7 for multi-layer films having a white layer ratio of 40% when subjected to a 47% strain. In particular, FIG. 9 shows a complex surface with the $\Delta E$ dipping (i.e., dropping) when both the white colorant concentrations and the black colorant concentrations are at 5% and again when the white and black colorant concentrations are at 10%. For example, as shown in FIG. 9, when the multi-layer film includes a white layer having a white colorant concentration of 10% and a black layer having a black colorant concentration of 10%, the multi-layer film exhibits a $\Delta E$ of about 1.11. Additionally, when the multi-layer film includes a white layer having a white colorant concentration of 5% and a black layer having a black colorant concentration of 10%, the multi-layer film exhibits a $\Delta E$ of about 2.21. Again, this is unexpected for that reasons discussed above as a film having a higher concentration of white colorant would be expected to exhibit a higher $\Delta E$ when strained when compared to a film having a lower concentration of white colorant. Again, one of ordinary skill in the art would anticipate the black to white colorant concentrations to follow a simple linear relationship. However, as illustrated in the graph of FIG. 9, this is not the case. Thus, the foregoing finding is again unexpected.

FIGS. 7-9 show how straining a multi-layer film with layers of different colors does not necessarily cause a perceivable $\Delta E$. Indeed, FIGS. 7-9 show how a change color will occur when subjected to strain if made with a proper layer ratio, white and black pigment concentrations the ratio of the layers, white concentration percentage, and black concentration percentage. For example, a multi-layer film with a strainable network having a white layer concentration of 10% and a black layer concentration of 10%, when subjected to a strain of 47% will not show an appreciable color change with a 40% white layer ratio but will show an appreciable color change with an 80% white layer ratio. Additionally, a multi-layer film with a strainable network having a 40% white layer ratio and a black layer concentration of 10%, when subjected to a strain of 47% will show an appreciable color change with a white layer concentration of 5%, but will not show an appreciable color change with a white layer concentration of 10%.

As shown above, the multi-layer co-extruded film can have a color change within a range of $\Delta E$ between about 2.50 and about 7.00 when subjected to a strain with a range of about 40% to about 60%. More particularly, the multi-layer co-extruded film can have a color change within a range of $\Delta E$ between about 3.00 and about 6.00 when subjected to a strain with a range of about 40% to about 60%. Still further, the multi-layer co-extruded film can have a color change within a range of $\Delta E$ between about 3.50 and about 5.85 when subjected to a strain with a range of about 40% to about 60%.

Furthermore, when the concentrations of light colorant and dark colorant are equal, increasing the ratio of the light colored layer(s) compared to the dark colored layer(s) can increase the perceivable color change. When the concentration of light colorant is greater than the concentration of dark colorant, increasing the ratio of the light colored layer(s) compared to the dark colored layer(s) can increase the perceivable color change. When the concentration of dark colorant is greater than the concentration of light colorant, increasing the ratio of the dark colored layer(s) compared to the light colored layer(s) can increase the perceivable color change.

Figure 10A:
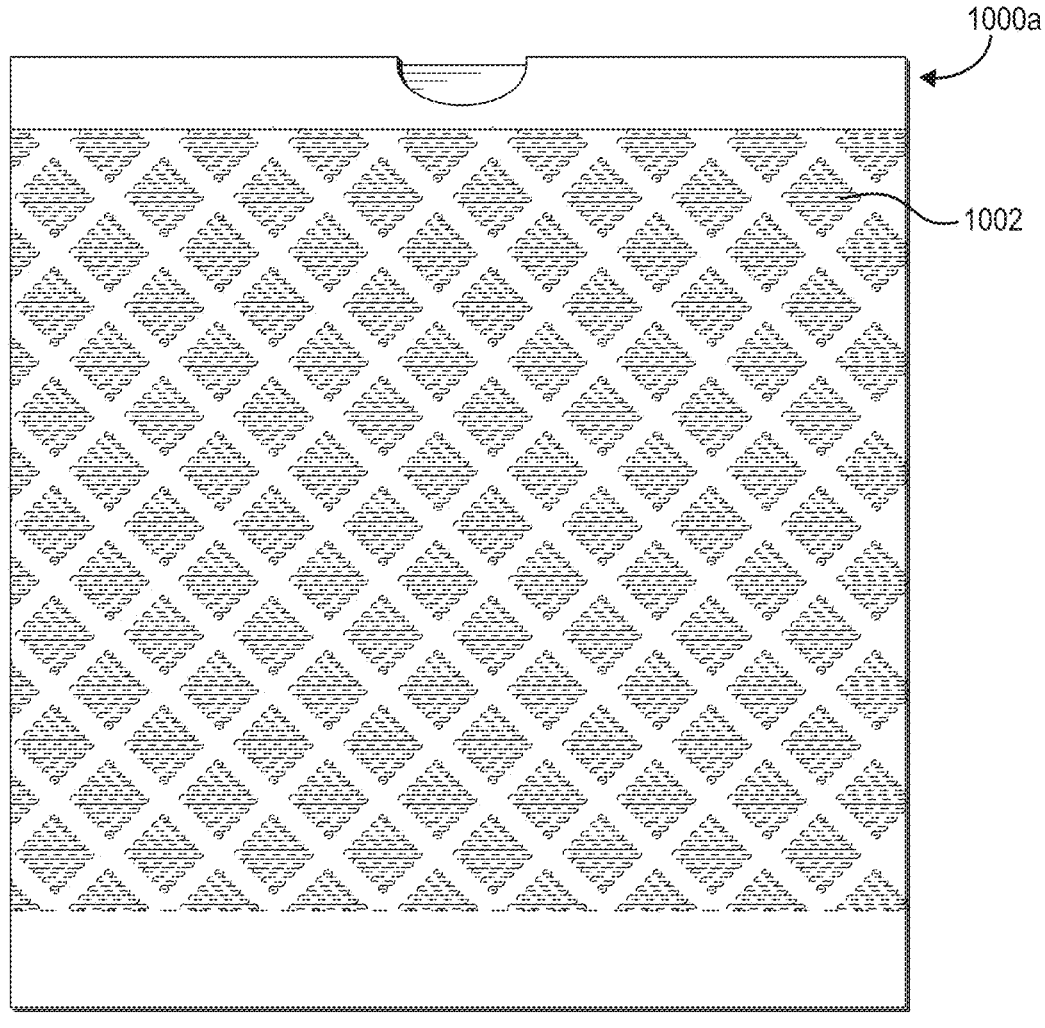
FIGS. 10A-10E shows thermoplastic fields including strainable networks according to one or more embodiments of the present disclosure.

FIG. 10A illustrates a thermoplastic bag 1000*a* having walls formed with multi-layer films such as the multi-layer films described above. Furthermore, the thermoplastic bag 1000*a* may exhibit the above-described color change when subjected to a strain. For example, the thermoplastic bag 1000*a* includes a strainable network 1002*a* formed by a SELF'ing process. The strainable network may exhibit the above-described color change when subjected to a strain. As shown in FIG. 10A, the strainable network 1002*a* is arranged in diamond patterns. For example, the thermoplastic bag 1000*a* can include the strainable network 1002*a* as described above in regard to FIGS. 5 and 6. Furthermore, the strainable network 1002*a* can provide the thermoplastic bag 1000*a* with increased elasticity; thereby, allowing the bag 1000*a* to stretch to the size of the bag 1000*a* when strained.

Thus, one will appreciate in light of the disclosure herein that a manufacturer can tailor specific sections or zones of a multi-layer bag with desirable properties by MD, TD, DD ring rolling, SELF'ing, or combinations thereof. One will appreciate in light of the disclosure herein that one or more implementations can include intermittently stretched regions arranged in other patterns/shapes. Such additional patterns include, but are not limited to, intermeshing circles, squares, diamonds, hexagons, or other polygons and shapes. Additionally, one or more implementations can include bonded regions arranged in patterns that are combinations of the illustrated and described patterns/shapes.

In another implementation, a pattern may be formed by embossing, in a process similar to ring rolling. Embossed patterns such as squares, diamonds, circles or other shapes may be embossed into a multi-layer bag. The embossed, laminated film layers may be prepared by any suitable means by utilizing two or more layers of preformed web of film and passing them between embossing rollers.

Figure 10B:
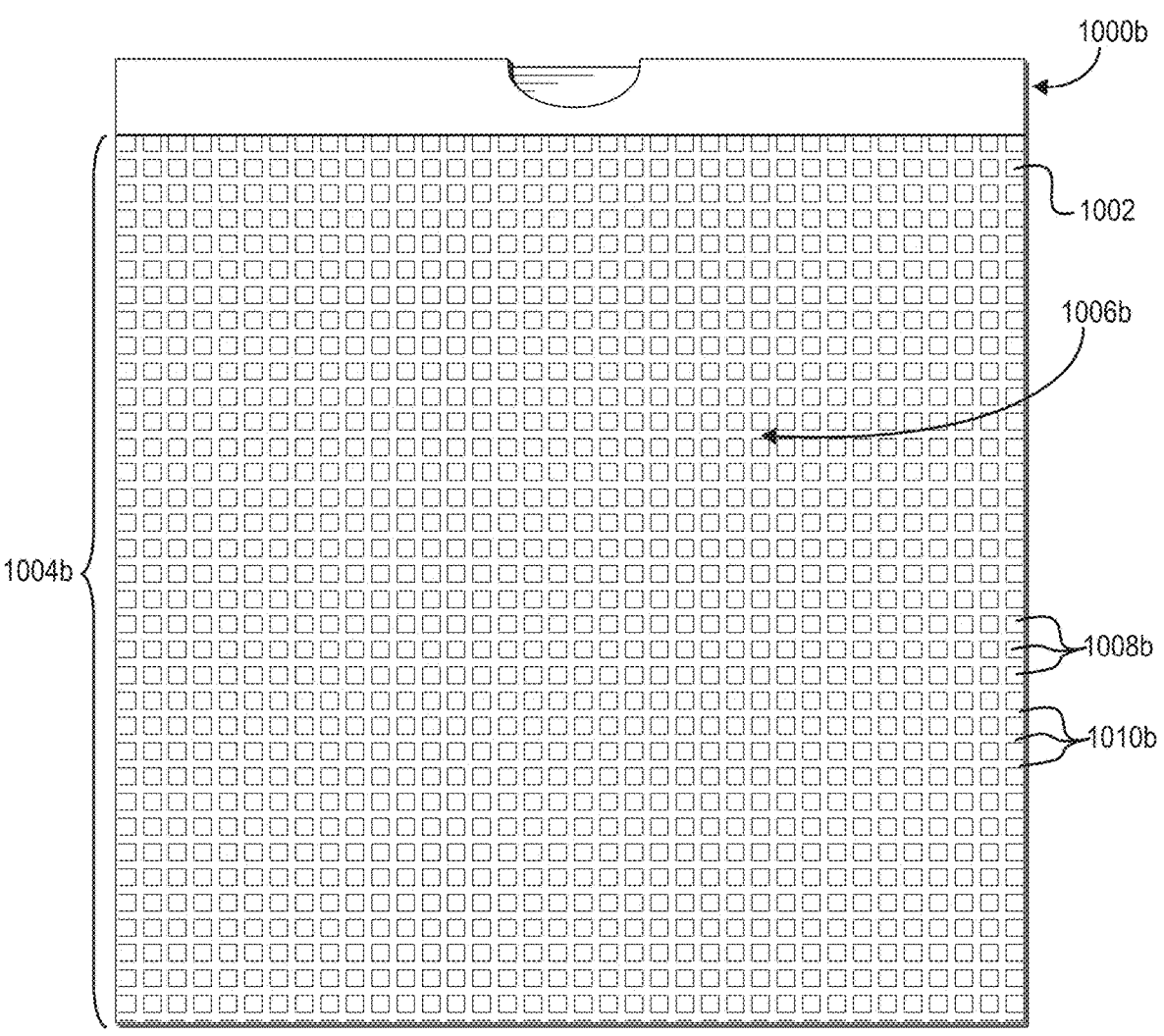

FIG. 10B illustrates a thermoplastic bag 1000*b* having walls formed with multi-layer films such as the multi-layer films described above. Furthermore, the thermoplastic bag 1000*b* may exhibit the above-described color change when subjected to a strain. For example, the thermoplastic bag 1000*b* includes a pattern 1002*b* formed by ring rolling processes. The pattern 1002*b* may exhibit the above-described color change when subjected to a strain. For example, a multi-layer film can undergo both an MD ring rolling process and a TD ring rolling process to further enhance, or otherwise modify, the physical properties of the film. In particular, FIG. 10B illustrates a top view of an intermittently-stretched film 1004*b* created by MD and TD ring rolling. The intermittently-stretched film 1004*b* can have a ribbed or checker board pattern 1006*b*. The ribbed pattern 1006*b* can include alternating series of thicker ribs or regions 1008*b* and thinner webs 1010*b*. The thinner webs 1010*b* can include webs 1010*b* that extend along the film 1004*b* in the machine direction created by TD ring rolling, and webs 1010*b* that extend along the film in the transverse direction created by MD ring rolling. As shown in FIG. 10B, in one or more implementations, the aspect ratio of the rows and columns of the stretched thinner ribs 1010*b* can be approximately 1 to 1. In alternative implementations, the aspect ratio of the rows and columns of the rows and columns of the stretched thinner webs 1010*b* can be greater or less than 1 to 1.

Figure 10C:
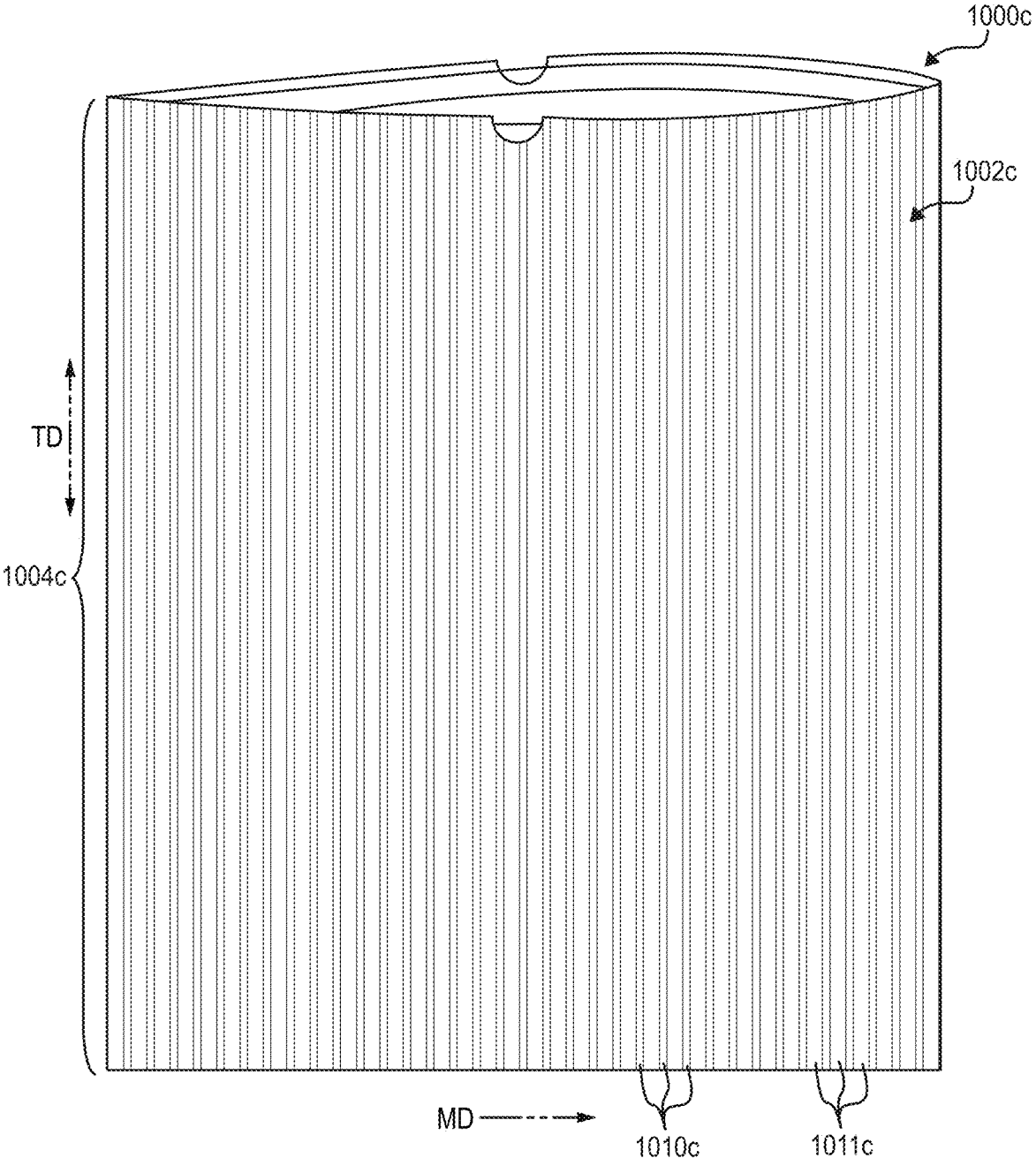

FIG. 10C shows a thermoplastic bag 1000*c* having walls formed with multi-layer films such as the multi-layer films described above. Furthermore, the thermoplastic bag 1000*c* may exhibit the above-described color change when subjected to a strain. For example, the thermoplastic bag 1000*c* includes a pattern 1002*c* formed by ring rolling processes. For example, FIG. 10C shows a top view of a thermoplastic bag 1000*c* having walls formed with a MD intermittently-stretched multi-layer film 1004*c*. In some embodiments, the multi-layer film 1004*c* can include thicker ribs 1010*c* and thinner stretched webs 1011*c* extending across the multi-layer film 1004*c* in a direction transverse (i.e., transverse direction) to a direction in which the multi-layer film 1004*c* was extruded (i.e., machine direction). As shown in FIG. 10C, the ribs and webs 1010*c*, 1011*c* may extend across the entire length of the multi-layer film 1004*c*.

FIG. 10C further shows that the thinner webs 1011*c* can be intermittently dispersed about ribs 1010*c*. In particular, each thinner web 1011*c* can reside between adjacent thicker ribs 1010*c*. Additionally, in one or more implementations the thicker ribs 1010*c* can be visually distinct from the thinner ribs 1011*c*.

Figure 10D:
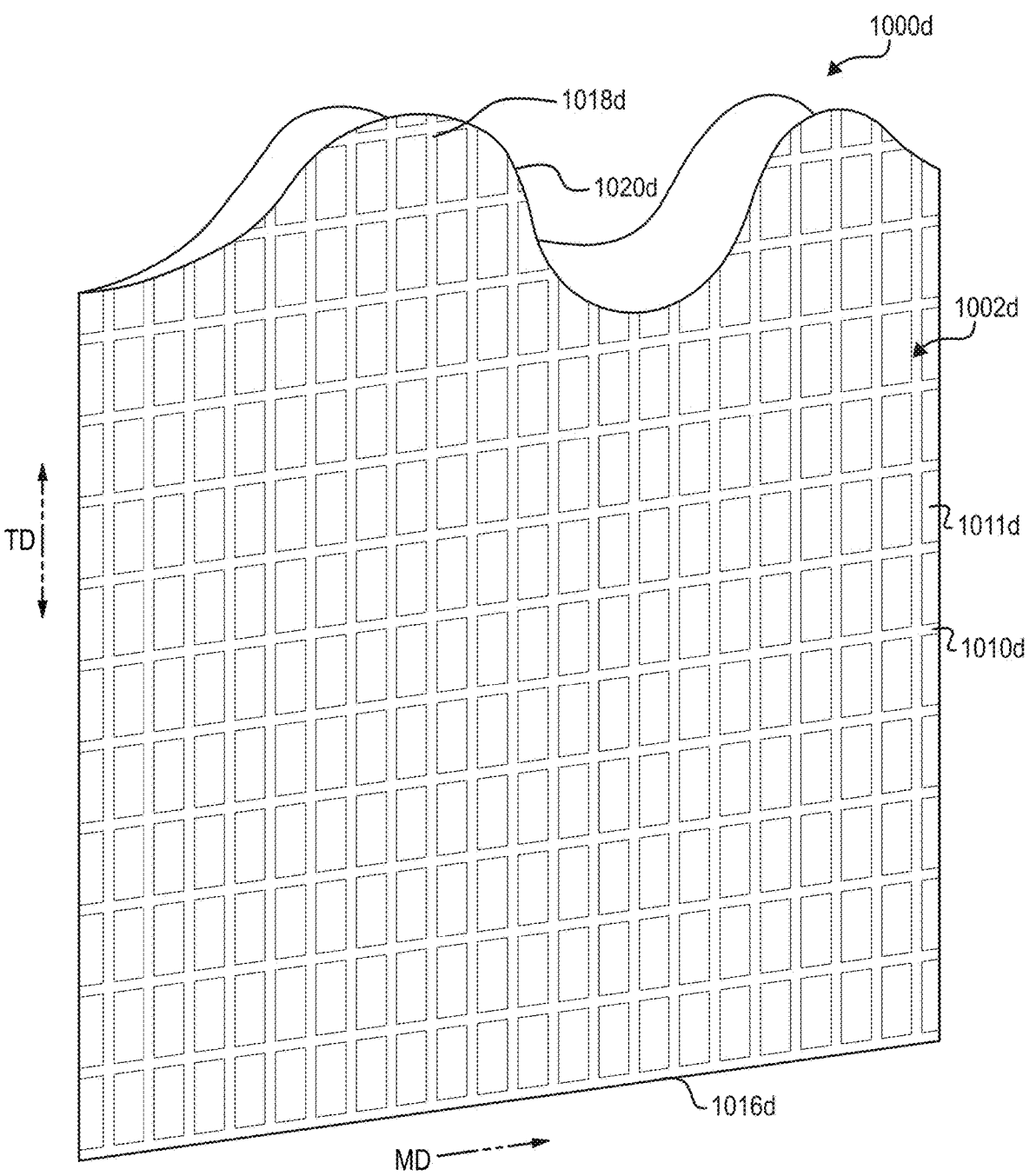

FIG. 10D shows a tie thermoplastic bag 1000*d* having walls formed with multi-layer films such as the multi-layer films described above. Furthermore, the thermoplastic bag 1000*d* may exhibit the above-described color change when subjected to a strain. For example, the thermoplastic bag 1000*d* includes pattern 1002*d* formed by ring rolling processes. For example, FIG. 10D shows a tie bag 1000*d* incorporating an MD- and TD-intermittently-stretched multi-layer film in accordance with an implementation of the present invention. As shown, the sides of the tie thermoplastic bag 1000*d* can include a ribbed pattern. The ribbed pattern can include thicker ribs 1011*d* and thinner, stretched webs 1010*d* created by MD and TD ring rolling.

The ribbed pattern can include thinner webs 1010*d* that extend across the tie thermoplastic bag 1000*d* in the machine direction. Additionally, the ribbed pattern can include thinner webs 1010*d* that extend across the tie thermoplastic bag 1000*d* in the transverse direction, or in other words from a bag bottom 1016*d* to flaps 1018*d* of an upper edge 1020*d* of the tie thermoplastic bag 1000*d*.

Figure 10E:
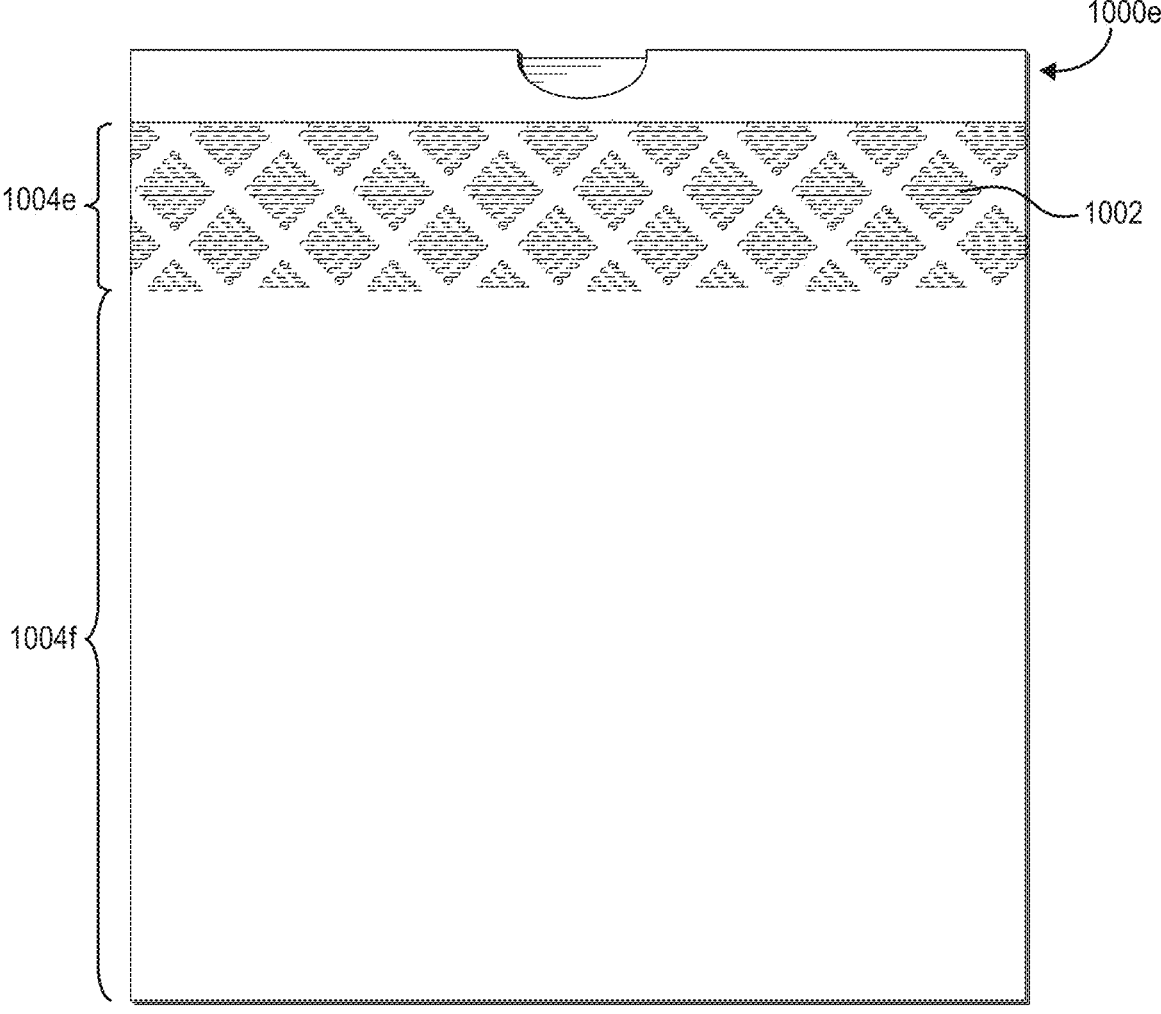

One will appreciate that the while FIGS. 10A-10D illustrate some exemplary embodiments of bags including patterns or strainable networks that exhibit a perceivable color change when subjected to a strain. While FIGS. 10A-10D illustrate examples in which the entire or substantially the entire bag includes the patterns or strainable networks, one will appreciate in light of the disclosure herein that the present invention is not so limited. For example, in additional embodiments, one or more discrete areas can include patterns or strainable networks that exhibit a perceivable color change when strained, while other discrete areas of the bag do not have patterns or strainable networks that exhibit a perceivable color change when strained. For example, FIG. 10E illustrates a bag 1000*e* with a strainable network 1002 formed by a SELF'ing process located in a band 10004*e* below the draw tap. The strainable network 1002 is configured to undergo a perceivable color change when subjected to an applied strain. FIG. 10E also illustrates that a lower section 1004*f* of the bag is devoid of a pattern or strainable network. In alternative embodiments, a bag an include strainable networks or patterns combined in different zones.

Figure 11:
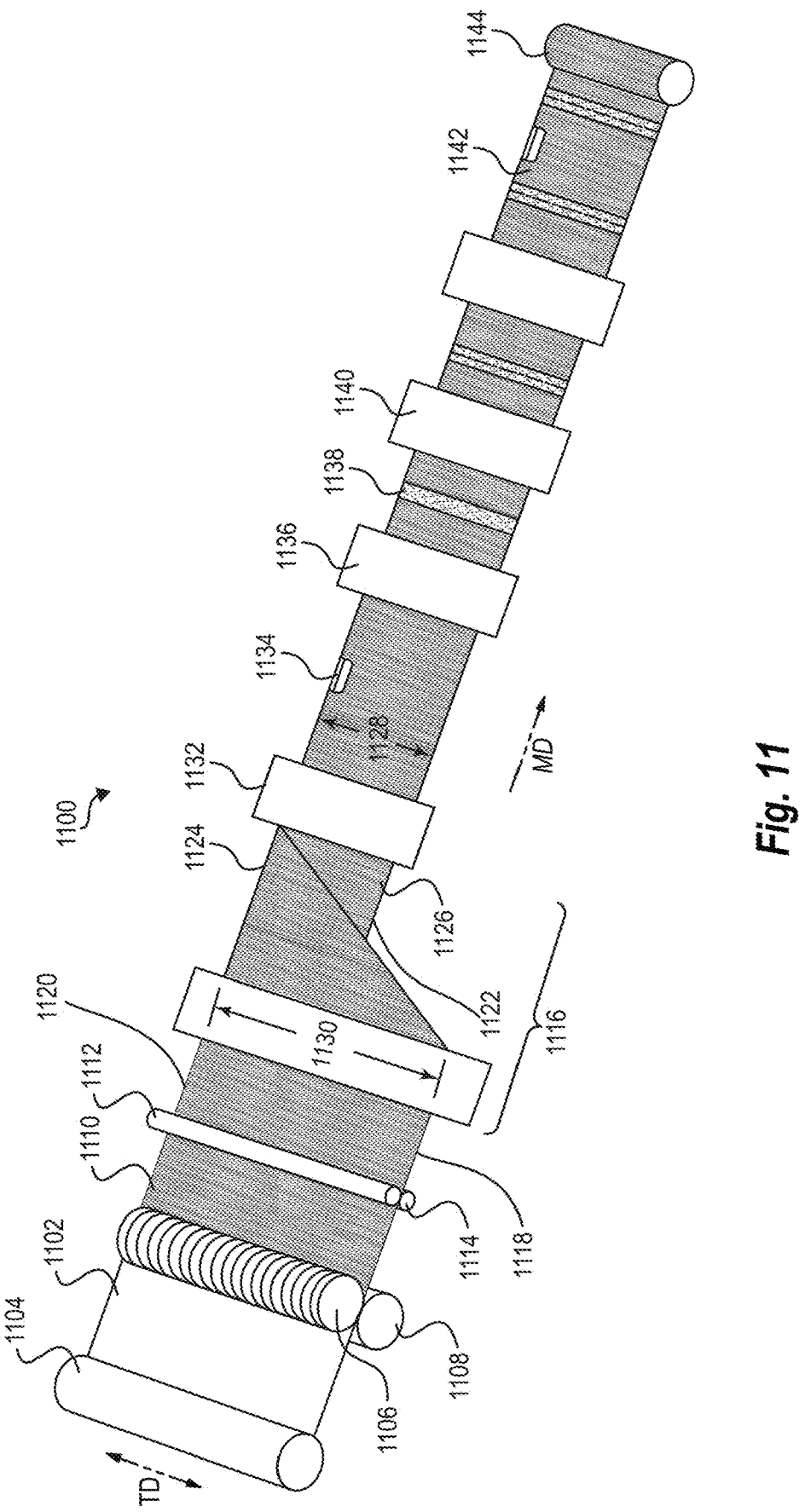
FIG. 11 illustrates a schematic diagram of a bag manufacturing process in accordance with one or more implementations of the present disclosure.

FIG. 11 illustrates an exemplary embodiment of a high-speed manufacturing process 1100. The high-speed manufacturing process 1100 can intermittently stretch a thermoplastic co-extruded multi-layer film in one or more of the machine direction and the transverse direction while enabling the multi-layer film to exhibit a color change when subjected to a strain such as the color changed described above in regard to FIG. 6. The process 1100 can then produce a thermoplastic bag therefrom. According to the exemplary process, an un-stretched multi-layer film 1102 is unwound from a roll 1104 and directed along a machine direction. The un-stretched film 1102 can pass between one or more pairs of cylindrical intermeshing rollers 1106, 1108 to intermittently stretch the un-stretched film 1102 and impart a stretched pattern thereon. In one or more embodiments, the un-stretched multi-layer film 1102 can pass through a first pair of intermeshing rollers (e.g., SELF'ing rollers 202, 204). In additional embodiments, the un-stretched multi-layer film 1102 can pass through a first pair of MD intermeshing rollers. In alternative implementations, the un-stretched multi-layer film 1102 can pass through only TD intermeshing rollers, or through TD intermeshing rollers and MD intermeshing rollers.

The rollers 1106, 1108 may be arranged so that their longitudinal axes are perpendicular to the machine direction. Additionally, the rollers 1106, 1108 may rotate about their longitudinal axes in opposite rotational directions. In various embodiments, motors may be provided that power rotation of the rollers 1106, 1108 in a controlled manner. As the un-stretched film passes between the rollers 1106, 1108 the ridges, teeth, and/or notches of the intermeshing rollers can impart a pattern and intermittently stretch the film, thereby creating an intermittently-stretched multi-layer film 1110 (i.e., one of multi-layer films 300*b*, 400*b*, 500, 600 or other intermittently-stretched multi-layer films).

During the manufacturing process 1100, the intermittently-stretched multi-layer film 1110 can also pass through a pair of pinch rollers 1112, 1114. The pinch rollers 1112, 1114 can be appropriately arranged to grasp the intermittently-stretched multi-layer film 1110. The pinch rollers 1112, 1114 may facilitate and accommodate the intermittently-stretched multi-layer film 1110.

A folding operation 1116 can fold the intermittently-stretched multi-layer film 1110 to produce the sidewalls of a finished thermoplastic bag. The folding operation 1116 can fold the intermittently-stretched multi-layer film 1110 in half along the transverse direction. In particular, the folding operation 1116 can move a first edge 1118 adjacent to a second edge 1120, thereby creating a folded edge 1122. The folding operation 1116 thereby provides a first multi-layer film half 1124 and an adjacent second multi-layer film half 1126. The overall width 1128 of the second multi-layer film half 1126 can be half the second width 1130 of the first multi-layer film multi-layer half 1124 of the intermittently-stretched multi-layer film 1110.

To produce the finished bag, the processing equipment may further process the folded intermittently-stretched multi-layer film 1110. In particular, a draw tape operation 1132 can insert a draw tape 1134 into the intermittently-stretched multi-layer film 1110. Furthermore, a sealing operation 1136 can form the parallel side edges of the finished bag by forming heat seals 1138 between adjacent portions of the folded intermittently-stretched multi-layer film 1110. Optionally, the process of passing the film through the rollers 1106, 1108 to stretch or SELF the film can take place between operations 1132 and 1136 rather than before the folding operation 1116. The heat seals 1138 may be spaced apart along the folded intermittently-stretched multi-layer film 1110. The sealing operation 1136 can form the heat seals 1138 using a heating device, such as, a heated knife.

A perforating operation 1140 may form a perforation in the heat seals 1138 using a perforating device, such as, a perforating knife. The perforations in conjunction with the folded outer edge 1122 can define individual bags 1142 that may be separated from the intermittently-stretched multi-layer film 1110. A roll 1144 can wind the intermittently-stretched multi-layer film 1110 embodying the finished bags 1142 for packaging and distribution. For example, the roll 1144 may be placed into a box or bag for sale to a customer.

In still further implementations, the folded intermittently-stretched multi-layer film 1110 may be cut into individual bags along the heat seals 1138 by a cutting operation. In another implementation, the folded intermittently-stretched multi-layer film 1110 with may be folded one or more times prior to the cutting operation. In yet another implementation, the side sealing operation 1136 may be combined with the cutting and/or perforation operations 1140.

The present disclosure may be embodied in other specific forms without departing from its spirit or essential characteristics. Thus, the described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A transverse-direction strained multi-layer co-extruded film comprising:

a first thermoplastic film layer of a first thermoplastic material comprising a first pigment that provides the first thermoplastic film layer with a first white color;

a second thermoplastic film layer of the first thermoplastic material comprising a second pigment that provides the second thermoplastic film layer with a second different black color, wherein:

the first thermoplastic material comprises linear low density polyethene (LLDPE);

the first and second thermoplastic film layers are co-extruded layers, and the first and second thermoplastic film layers are devoid of voiding agents; and a plurality of raised rib-like elements formed in the first and second thermoplastic film layers about around flat regions of the first and second thermoplastic film layers, the plurality of raised rib-like elements formed from intermittently stretched and thicker regions and the plurality of raised rib-like elements provide the transverse-direction strained multi-layer co-extruded film with increased elasticity, wherein:

a thickness of the first thermoplastic film layer comprising the first white color comprises 80% of a thickness of the transverse-direction strained multi-layer co-extruded film;

a thickness of the second thermoplastic film layer comprising the second different black color comprises 20% of the thickness of the transverse-direction strained multi-layer co-extruded film;

a concentration by mass of the first pigment in the first thermoplastic film layer is between eight percent and ten percent;

a concentration by mass of the second pigment in the second thermoplastic film layer is between four percent and seven percent;

the transverse-direction strained multi-layer co-extruded film has a color appearance that has a perceivable color change relative to a first color appearance when the plurality of raised rib-like elements are unstrained within a range of $\Delta E$ 5.4 and 7.00, and the plurality of raised rib-like elements are strained in-plane with the flat regions by a strain applied subsequent to formation of the plurality of raised rib-like elements within a range of 40% to 60%.

2. The transverse-direction strained multi-layer co-extruded film of claim 1, wherein the perceivable color change is within a range of $\Delta E$ 5.4 and 6.0.

3. The transverse-direction strained multi-layer co-extruded film of claim 2, wherein the concentration by mass of the second pigment in the second thermoplastic film layer is five percent.

4. The transverse-direction strained multi-layer co-extruded film of claim 1, wherein intermittently stretched regions exhibit the perceivable color change.

5. The transverse-direction strained multi-layer co-extruded film of claim 1, wherein the plurality of raised rib-like elements comprise a plurality of isolated raised deformed regions arranged in a pattern.

6. The transverse-direction strained multi-layer co-extruded film of claim 5, wherein the plurality of raised rib-like elements are arranged in a repeating diamond pattern.

7. The transverse-direction strained multi-layer co-extruded film of claim 3, wherein the concentration by mass of the first pigment in the first thermoplastic film layer is ten percent.

8. The transverse-direction strained multi-layer co-extruded film of claim 1, wherein:

the first thermoplastic film layer comprises a plurality of co-extruded layers of the first white color;

the second thermoplastic film layer comprises a plurality of co-extruded layers of the second different black color; and the co-extruded layers of the first white color do not alternate with the co-extruded layers of the second different black color.

9. A strained thermoplastic bag, comprising:

a first wall and a second wall joined along a bottom edge, a first side edge, and an opposing second side edge, wherein each of the first wall and the second wall comprises:

a transverse-direction strained multi-layer co-extruded film comprising a first thermoplastic film layer of a first thermoplastic material and a second thermoplastic film layer of the first thermoplastic material, wherein:

the first thermoplastic film layer comprises a white color created by a first colorant and the second thermoplastic film layer comprises a black color created by a second colorant, the first and second thermoplastic film layers are co-extruded layers, the first thermoplastic material comprises linear low density polyethene (LLDPE);

the transverse-direction strained multi-layer co-extruded film is devoid of voiding agents; and a plurality of raised rib-like elements formed in the first and second thermoplastic film layers about flat regions of the first and second thermoplastic film layers wherein the plurality of raised rib-like elements provide the strained thermoplastic bag with increased elasticity, wherein:

a thickness of the first thermoplastic film layer comprising the white color comprises 40% of a thickness of the transverse-direction strained multi-layer co-extruded film;

a thickness of the second thermoplastic film layer comprising the black color comprises 60% of the thickness of the transverse-direction strained multi-layer co-extruded film;

a concentration by mass of the first colorant in the first thermoplastic film layer is between eight percent and ten percent; and the concentration by mass of the second colorant in the second thermoplastic film layer is between four and seven percent;

the transverse-direction strained multi-layer co-extruded film has a color appearance that has a perceivable color change relative to a first color appearance when the plurality of raised rib-like elements are unstrained within a range of $\Delta E$ 3.0 and 7.00;

the plurality of raised rib-like elements are strained in-plane with the flat regions by a strain applied subsequent to formation of the plurality of raised rib-like elements within a range of 40% to 60%.

10. The strained thermoplastic bag as recited in claim 9, wherein the plurality of raised rib-like elements are entirely located in a band proximate a top edge of the strained thermoplastic bag.

11. The strained thermoplastic bag as recited in claim 9, wherein the plurality of raised rib-like elements are formed from intermittently stretched and thicker regions.

12. The strained thermoplastic bag as recited in claim 9, wherein the perceivable color change is within a range of $\Delta E$ between 3.0 and 6.00.

13. The strained thermoplastic bag as recited in claim 11, wherein the first thermoplastic film layer comprises a concentration by mass of the first colorant between nine percent and ten percent.

14. The strained thermoplastic bag as recited in claim 11, wherein the intermittently stretched regions exhibit the perceivable color change.

15. The strained thermoplastic bag as recited in claim 13, wherein:

the first thermoplastic film layer comprises a plurality of co-extruded layers of the white color;

the second thermoplastic film layer comprises a plurality of co-extruded layers of the black color; and the co-extruded layers of the white color do not alternate with the co-extruded layers of the black color.

16. The strained thermoplastic bag as recited in claim 13, wherein the concentration by mass of the second colorant in the second thermoplastic film layer is between four percent and six percent.

17. The strained thermoplastic bag as recited in claim 13, wherein concentration by mass of the first colorant in the first thermoplastic film layer is five percent and the concentration by mass of the second colorant in the second thermoplastic film layer is ten percent.

18. A strained multi-layer thermoplastic bag comprising:

a first wall and a second wall joined along a bottom edge, a first side edge, and an opposing second side edge, wherein each of the first wall and the second wall comprises a transverse-direction strained multi-layer co-extruded film comprising:

a first thermoplastic film layer of a first thermoplastic material comprising a first pigment that provides the first thermoplastic film layer with a first white color and a second thermoplastic film layer of the first thermoplastic material comprising a second pigment that provides the second thermoplastic film layer with a second different black color, wherein:

the first thermoplastic material comprises linear low density polyethene (LLDPE);

the first pigment comprises $TiO_2$ and wherein the second pigment comprises carbon black;

the first and second thermoplastic film layers are co-extruded layers, the first and second thermoplastic film layers are devoid of voiding agents; and a plurality of raised rib-like elements formed in the first and second thermoplastic film layers about flat regions of the first and second thermoplastic film layers wherein the plurality of raised rib-like elements provide the strained multi-layer thermoplastic bag with increased elasticity, wherein:

a thickness of the first thermoplastic film layer comprising the first white color comprises 40% of a thickness of a given wall of the transverse-direction strained multi-layer co-extruded film;

a thickness of the second thermoplastic film layer comprising the second different black color comprises 60% of the thickness of the given wall of the transverse-direction strained multi-layer co-extruded film;

a concentration by mass of the second pigment in the second thermoplastic film layer is between four percent and seven percent;

a concentration by mass of the first pigment in the first thermoplastic film layer is between eight percent and ten percent; and the transverse-direction strained multi-layer co-extruded film has a color appearance that has a perceivable color change relative to a first color appearance when the plurality of raised rib-like elements are unstrained within a range of $\Delta E$ 3.0 and 7.00, wherein the plurality of raised rib-like elements are strained in-plane with the flat regions by a strain applied subsequent to formation of the plurality of raised rib-like elements within a range of 40% to 60%.

19. The strained multi-layer thermoplastic bag of claim 18, wherein the perceivable color change is within a range of $\Delta E$ 3.0 and 6.0.

20. The strained multi-layer thermoplastic bag of claim 19, wherein the concentration by mass of the first pigment in the first thermoplastic film layer is five percent and the concentration by mass of the second pigment in the second thermoplastic film layer is ten percent.

* * * * *